US011072197B2

(12) United States Patent
Mizushima et al.

(10) Patent No.: US 11,072,197 B2
(45) Date of Patent: Jul. 27, 2021

(54) METHOD FOR MANUFACTURING PRINTED MATTER

(71) Applicant: KAO CORPORATION, Tokyo (JP)

(72) Inventors: Ryuma Mizushima, Wakayama (JP);
Yuta Matsumoto, Wakayama (JP);
Yasufumi Ueda, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 16/485,298

(22) PCT Filed: Feb. 15, 2018

(86) PCT No.: PCT/JP2018/005282
§ 371 (c)(1),
(2) Date: Aug. 12, 2019

(87) PCT Pub. No.: WO2018/151219
PCT Pub. Date: Aug. 23, 2018

(65) Prior Publication Data
US 2019/0375225 A1 Dec. 12, 2019

(30) Foreign Application Priority Data
Feb. 16, 2017 (JP) .............................. JP2017-026834

(51) Int. Cl.
B41J 11/00 (2006.01)
B41M 5/50 (2006.01)
C09D 11/033 (2014.01)
C09D 11/30 (2014.01)
B41M 5/00 (2006.01)
B41M 1/30 (2006.01)
B41F 19/00 (2006.01)
B41F 23/04 (2006.01)

(52) U.S. Cl.
CPC ........... *B41M 5/502* (2013.01); *B41F 19/007* (2013.01); *B41F 23/044* (2013.01); *B41J 11/0015* (2013.01); *B41M 1/305* (2013.01); *B41M 5/0011* (2013.01); *B41M 5/0047* (2013.01); *C09D 11/033* (2013.01); *C09D 11/30* (2013.01)

(58) Field of Classification Search
CPC ... B41J 11/0015; B41F 19/007; B41F 23/044; B41M 1/305; B41M 5/0047; B41M 5/502
See application file for complete search history.

(56) References Cited

U.S. PATENT DOCUMENTS

| 6,397,740 | B1 | 6/2002 | Dubuit |
| 6,528,129 | B1 | 3/2003 | Kondo |
| 2004/0187715 | A1 | 9/2004 | Niimi |
| 2009/0058971 | A1 | 3/2009 | Laaspere et al. |
| 2011/0234672 | A1 | 9/2011 | Ohtsu et al. |
| 2011/0234682 | A1 | 9/2011 | Ohta et al. |
| 2012/0200651 | A1 | 8/2012 | Sasada et al. |

(Continued)

FOREIGN PATENT DOCUMENTS

| CN | 102198751 A | 9/2011 |
| CN | 102199383 A | 9/2011 |

(Continued)

OTHER PUBLICATIONS

International Search Report, issued in PCT/JP2018/005282, PCT/ISA/210, dated Apr. 3, 2018.
English machine translation for JP-2011-178143-A dated Sep. 15, 2011.
English machine translation for JP-2013-107343-A dated Jun. 6, 2013.
English machine translation for JP-2013-91232-A dated May 16, 2013.
English machine translation for JP-2013-95562-A dated May 20, 2013.
English machine translation for JP-2015-91658-A dated May 14, 2015.

(Continued)

*Primary Examiner* — Lamson D Nguyen
(74) *Attorney, Agent, or Firm* — Birch, Stewart, Kolasch & Birch, LLP

(57) ABSTRACT

The present invention relates to [1] a process for producing a printed material, including step 1 of subjecting an image-bearing surface of a printed recording medium 1' on which characters or images are formed by analog printing to discharge treatment under specific conditions to obtain a printed recording medium 1, and step 2 of further forming characters or images on the image-bearing surface of the printed recording medium 1 by ink-jet printing using a water-based ink to obtain the printed material, [2] an ink-jet printing method including the step of ejecting a water-based ink onto a printed recording medium 1 by an ink-jetting method to form characters or images thereon, in which the printed recording medium 1 has an image-bearing surface on which characters or images are formed by analog printing, and the image-bearing surface is subjected to discharge treatment under the specific conditions, [3] a recording medium for ink-jet printing, including an image-bearing surface on which characters or images are formed by analog printing and which is subjected to discharge treatment, in which a surface free energy of the image-bearing surface after being subjected to the discharge treatment is not less than 30 mN/m, and [4] a printed material including an image-bearing surface on which characters or images are formed by analog printing and then on at least a part of which characters or images are further formed by ink-jet printing using a water-based ink, in which the image-bearing surface after forming the characters or images thereon by the analog printing is subjected to discharge treatment, and a surface free energy of the image-bearing surface after being subjected to the discharge treatment is not less than 30 mN/m.

12 Claims, No Drawings

(56) References Cited

U.S. PATENT DOCUMENTS

| | | | |
|---|---|---|---|
| 2013/0157105 A1 | 6/2013 | Picard et al. | |
| 2014/0204156 A1 | 7/2014 | Gotou | |
| 2015/0202897 A1 | 7/2015 | Nagai et al. | |
| 2016/0177116 A1 | 6/2016 | Katsuragi et al. | |
| 2019/0375225 A1* | 12/2019 | Mizushima | B41F 23/044 |
| 2020/0262228 A1* | 8/2020 | Hagiwara | B41M 5/0047 |

FOREIGN PATENT DOCUMENTS

| | | |
|---|---|---|
| CN | 102627885 A | 8/2012 |
| CN | 103069618 A | 4/2013 |
| CN | 103935148 A | 7/2014 |
| CN | 104789040 A | 7/2015 |
| JP | 11-321073 | 11/1999 |
| JP | 2000-301711 A | 10/2000 |
| JP | 2001-71483 A | 3/2001 |
| JP | 2002-361833 A | 12/2002 |
| JP | 2003-291495 A | 10/2003 |
| JP | 2004-291493 A | 10/2004 |
| JP | 2007-152633 A | 6/2007 |
| JP | 2010-537855 A | 12/2010 |
| JP | 2011-178143 A | 9/2011 |
| JP | 2013-91232 A | 5/2013 |
| JP | 2013-95562 A | 5/2013 |
| JP | 2013-107343 A | 6/2013 |
| JP | 2014-166713 A | 9/2014 |
| JP | 2015-91658 A | 5/2015 |
| JP | 2015-148794 A | 8/2015 |
| JP | 2016-117872 A | 6/2016 |
| JP | 2016-199015 A | 12/2016 |
| WO | WO 2009/079572 A1 | 6/2009 |

OTHER PUBLICATIONS

English machine translation for JP-2016-117872-A dated Jun. 30, 2016.

English machine translation for JP-2016-199015-A dated Dec. 1, 2016.

Extended European Search Report dated Dec. 1, 2020 for Application No. 18754602.3.

* cited by examiner

METHOD FOR MANUFACTURING PRINTED MATTER

FIELD OF THE INVENTION

The present invention relates to a process for producing a printed material, an ink-jet printing method and a recording medium for ink-jet printing.

BACKGROUND OF THE INVENTION

Hitherto, as a method of printing a large number of the same characters or images, there has been adopted contact-type analog printing such as gravure printing, flexographic printing and offset printing. Although the analog printing is excellent in productivity and cost efficiency, in recent years, there is an increasing demand for such a printing method in which variable data such as lot information are printed on an image-bearing surface having the characters or images printed by the analog printing in order to meet the requirements of individual customers.

On the other hand, the ink-jet printing method is such a printing method in which droplets of ink for ink-jet printing are directly projected onto a recording medium from very fine nozzles and allowed to adhere to the recording medium to form characters or images thereon. The ink-jet printing method needs no printing plate, and therefore has such an advantage that the variable data can be easily printed at low cost.

In consequence, as a method of printing additional variable data on an image-bearing surface on which characters or images have been previously formed by analog printing, there have been developed printing technologies in which the analog printing is used in combination with ink-jet printing.

For example, JP 2015-148794A (Patent Literature 1) discloses a printed film for a container having images printed by ink-jet printing and images printed by a printing method other than the ink-jet printing which are respectively formed on a transparent film, in which the images printed by the ink-jet printing are formed between a topcoat layer and an undercoat layer, and the images printed by the other printing method are formed between the undercoat layer and an adhesive layer.

JP 2014-166713A (Patent Literature 2) discloses a method of printing multicolor images on a resin film, in which white color images are printed by gravure printing or flexographic printing, whereas color images other than the white color images are printed by an ink-jet printing method, and an UV-curable ink is used as an ink for the ink-jet printing.

JP 2010-537855A (Patent Literature 3) discloses a method of printing an image on a substrate using a printing machine, in which a raster image formed of image dots is printed on the substrate using a first printing unit, and then at least one contiguous area of ink-jet dots is printed on the raster image using an ink-jet printing unit, so that substantially all of the ink-jet dots forming the contiguous area are printed at dot locations having similar surface wetting properties.

JP 2002-361833A (Patent Literature 4) discloses a hybrid printing apparatus including a plate printing mechanism and a plate-less printing mechanism which serve for printing of a plate printing region and a plate-less printing region, respectively, which two printing regions both are provided within an image-forming area of a printed material, in which an ink-jet printer is used as the plate-less printing mechanism.

In addition, as the ink-jet printing method, there is also known the method in which an ink-receiving layer is formed on a surface of a recording medium, and not only the recording medium, but also the ink-receiving layer are subjected to physical discharge treatment in order to improve quality of characters or images printed thereon.

For example, JP 11-321073A (Patent Literature 5) discloses a method for producing a recording medium for a printer which is improved in quality of characters or images to be printed thereon by subjecting an ink-receiving layer thereof to corona discharge treatment, and can be therefore applied to various kinds of printers.

JP 2000-301711A (Patent Literature 6) discloses a method for producing a recording medium for ink-jet printing in which a substrate on which an ink-receiving layer is formed is subjected to plasma treatment to improve liquid absorbing properties and bleeding resistance thereof.

SUMMARY OF THE INVENTION

The present invention relates to a process for producing a printed material, including the following steps 1 and 2:

Step 1: subjecting an image-bearing surface of a printed recording medium 1' on which characters or images are formed by analog printing to discharge treatment under the following conditions to obtain a printed recording medium 1, Discharge Treatment Conditions:

Discharge treatment quantity in terms of an integrated irradiation quantity of electric energy: not less than 0.5 $kW \cdot min/m^2$ and not more than 5.5 $kW \cdot min/m^2$, and Discharge treatment rate in terms of a transportation speed of the printed recording medium: not less than 1 m/min and not more than 100 m/min; and Step 2: further forming characters or images on the image-bearing surface of the printed recording medium 1 obtained in the step 1 by ink-jet printing using a water-based ink to obtain the printed material.

DETAILED DESCRIPTION OF THE INVENTION

The image-bearing surface on which characters or images are formed by analog printing contains a polymer component such as a polyamide, a polyurethane, a nitrocellulose, a polyethylene wax and a rosin-modified resin as well as various additives as solid components of an analog printing ink and therefore tends to have hydrophobic properties, so that a water-based ink used in the subsequent ink-jet printing tends to be repelled therefrom. For this reason, upon conducting the ink-jet printing on the image-bearing surface, characters or images formed by the ink-jet printing tend to be deteriorated in hiding power and readily suffer from peeling, and also tend to have poor adhesion to the image-bearing surface, so that the resulting printed material tends to fail to exhibit a good image quality.

In the Patent Literature 1, there is described the technology in which the undercoat layer is formed between the analog printed surface and the ink-jet printed surface. In the Patent Literature 2, there is described the technology in which by using the UV-curable ink as the ink for ink-jet printing, the high-viscous ink is cured for a short period of time. In the Patent Literatures 3 and 4, there are described the technologies in which the ink-jet printing is conducted on portions that are subjected to no analog printing. In these Patent Literatures, it is described that the characters or images printed by these technologies can exhibit a good image quality.

However, in the case where the undercoat layer as described in the Patent Literature 1, or the ink-receiving layer or the image-receiving layer as described in the Patent Literature 5 or 6, is formed after conducting the analog printing, the number of steps in these printing methods increases owing to addition of the aforementioned steps, which therefore tends to cause deterioration in productivity of the printed materials. In the case of using the UV-curable ink as described in the Patent Literature 2, since the polymerizable monomers or the polymerization initiator are contained in the ink, the use of such an ink tends to cause undesirable environmental problems. The technologies described in the Patent Literatures 3 and 4 tend to limit the degree of freedom of characters or images to be printed.

The present invention relates to a process for producing a printed material in which when conducting ink-jet printing using a water-based ink on an image-bearing surface on which characters or images have been previously formed by analog printing, it is possible to produce such a printed material on which characters or images having excellent hiding power and adhesion properties can be further formed on the image-bearing surface by the ink-jet printing, with a less burden on the environment and high productivity; an ink-jet printing method; and a recording medium for ink-jet printing.

Meanwhile, the term "printing" as used herein means a concept that includes printing or typing for printing characters or images, and the term "printed material" as used herein means a concept that includes printed matters or typed materials on which the characters or images are printed.

The present inventors have found that by the method in which after subjecting an image-bearing surface on which characters or images are formed by analog printing to discharge treatment under specific conditions, characters or images are further formed on the image-bearing surface by ink-jet printing, it is possible to improve hiding power and adhesion properties of the characters or images formed by the ink-jet printing, with a less burden on the environment and high productivity.

That is, the present invention relates to the following aspects [1] to [4].

[1] A process for producing a printed material, including the following steps 1 and 2:

Step 1: subjecting an image-bearing surface of a printed recording medium 1' on which characters or images are formed by analog printing to discharge treatment under the following conditions to obtain a printed recording medium 1, Discharge Treatment Conditions:

Discharge treatment quantity in terms of an integrated irradiation quantity of electric energy: not less than 0.5 kW·min/m$^2$ and not more than 5.5 kW·min/m$^2$, and Discharge treatment rate in terms of a transportation speed of the printed recording medium: not less than 1 m/min and not more than 100 m/min; and Step 2: further forming characters or images on the image-bearing surface of the printed recording medium 1 obtained in the step 1 by ink-jet printing using a water-based ink to obtain the printed material.

[2] An ink-jet printing method including the step of ejecting a water-based ink onto a printed recording medium 1 by an ink-jetting method to form characters or images thereon, in which the printed recording medium 1 includes an image-bearing surface on which characters or images are formed by analog printing, and the image-bearing surface is subjected to discharge treatment under the aforementioned conditions.

[3] A recording medium for ink-jet printing, including an image-bearing surface on which characters or images are formed by analog printing and which is subjected to discharge treatment, in which a surface free energy of the image-bearing surface after being subjected to the discharge treatment is not less than 30 mN/m.

[4] A printed material including an image-bearing surface on which characters or images are formed by analog printing and then on at least a part of which characters or images are further formed by ink-jet printing using a water-based ink, in which the image-bearing surface after forming the characters or images thereon by the analog printing is subjected to discharge treatment, and a surface free energy of the image-bearing surface after being subjected to the discharge treatment is not less than 30 mN/m.

In accordance with the present invention, there are provided a process for producing a printed material in which when conducting ink-jet printing using a water-based ink on an image-bearing surface on which characters or images have been previously formed by analog printing, it is possible to produce such a printed material on which characters or images having excellent hiding power and adhesion properties are further formed on the image-bearing surface by the ink-jet printing, with a less burden on the environment and high productivity; an ink-jet printing method; and a recording medium for ink-jet printing.

In particular, even in the case where the ink-jet printing used in the present invention is conducted by a one-pass printing method using a frequency of not less than 20 kHz (corresponding to a printing speed of not less than 50 m/min), the printed material can be produced without deterioration in productivity. Therefore, the process for producing a printed material, the ink-jet printing method and the recording medium for ink-jet printing according to the present invention can be more effectively applied to even such a printing method.

[Process for Producing Printed Material]

The process for producing a printed material according to the present invention includes the following steps 1 and 2:

Step 1: subjecting an image-bearing surface of a printed recording medium 1' on which characters or images are formed by analog printing to discharge treatment under the following conditions to obtain a printed recording medium 1, Discharge Treatment Conditions:

Discharge treatment quantity in terms of an integrated irradiation quantity of electric energy: not less than 0.5 kW·min/m$^2$ and not more than 5.5 kW·min/m$^2$, and Discharge treatment rate in terms of a transportation speed of the printed recording medium: not less than 1 m/min and not more than 100 m/min; and Step 2: further forming characters or images on the image-bearing surface of the printed recording medium 1 obtained in the step 1 by ink-jet printing using a water-based ink to obtain the printed material.

In the process for producing a printed material according to the present invention, when conducting ink-jet printing using a water-based ink on an image-bearing surface on which characters or images have been previously formed by analog printing (hereinafter also referred to merely as an "analog printed image-bearing surface"), it is possible to produce a printed material in which characters or images having excellent hiding power and adhesion properties are further formed on the image-bearing surface by the ink-jet printing, with a less burden on the environment and high productivity. The reason why the aforementioned advantageous effect can be attained by the present invention is considered as follows, though it is not clearly determined yet.

The discharge treatment conducted in the present invention is such a treatment in which electric energy is applied to a gas to maintain the gas in an electrically discharged state, and the image-bearing surface is exposed to a plasma in which electrons having a negative charge, ions having a positive charge, electrically neutral radicals and gas molecules are allowed to coexist together, to modify the image-bearing surface. The discharge treatment has such an advantage that by introducing a hydrophilic functional group into a polymer contained in the image-bearing surface and removing stains on the image-bearing surface, it is possible to improve wettability of the image-bearing surface. On the other hand, in the discharge treatment, the image-bearing surface is roughened and formed into a finely porous structure, thereby causing deterioration in characteristics of the image-bearing surface and deformation of the recording medium. For this reason, no useful studies have been conventionally made concerning the method of directly subjecting the image-bearing surface having printed characters or images to the discharge treatment.

However, the analog printed image-bearing surface contains a polyamide, a polyurethane, a nitrocellulose, a polyethylene wax, a rosin-modified resin, etc., as solid components of an analog printing ink, and therefore tends to have hydrophobic properties. It is considered that if the analog printed image-bearing surface having the aforementioned properties is subjected to the discharge treatment under the specific conditions, a hydrophilic functional group is introduced into the image-bearing surface while suppressing deterioration in characteristics of the image-bearing surface and deformation of the recording medium, so that the image-bearing surface can be enhanced in wettability to the water-based ink used in the ink-jet printing, and can also be improved in hiding power and adhesion properties. In consequence, it is considered that even when conducting the ink-jet printing on the analog printed image-bearing surface according to the process including the aforementioned steps 1 and 2 in which the discharge treatment is conducted under the specific conditions, it is possible to produce a printed material on which characters or images having improved hiding power and adhesion properties are formed by the ink-jet printing, with a less burden on the environment and high productivity.

(Step 1)
<Printed Recording Medium 1'>

The step 1 is the step of subjecting an image-bearing surface of a printed recording medium 1' on which characters or images are formed by analog printing to discharge treatment under the aforementioned conditions to obtain a printed recording medium 1. By conducting the step 1, it is possible to obtain the printed recording medium 1 including the image-bearing surface on which characters or images are formed by the analog printing and which is subjected to discharge treatment under the aforementioned conditions. The printed recording medium 1 is used as a recording medium for ink-jet printing to form characters or images thereon by ink-jet printing, so that it is possible to obtain a printed material on which characters or images having excellent hiding power and adhesion properties are formed.

The printed recording medium 1' used in the step 1 is not particularly limited, and is preferably formed of a paper recording medium or a resin recording medium. It is also preferred that characters or images are formed on these recording medium by analog printing.

Examples of the paper recording medium include a plain paper, a form paper, a coated paper, an art paper, a photographic paper, etc. Among these paper recoding medium, preferred are a coated paper and an art paper.

As the resin recording medium, there may be mentioned a transparent synthetic resin film. Examples of the transparent synthetic resin film include a polyester film, a vinyl chloride film, a polypropylene film, a polyethylene film, a nylon film, etc. These films may be in the form of any of a biaxially oriented film, a monoaxially oriented film and a non-oriented film. Among these films, preferred is a polyester film.

The thickness of the resin recording medium is not particularly limited, and the resin recording medium may be in the form of a thin film having a thickness of not less than 1 μm and less than 20 μm. However, from the viewpoint of inhibiting poor appearance of the recording medium and improving availability thereof, the thickness of the resin recording medium is preferably not less than 20 μm, more preferably not less than 50 μm and even more preferably not less than 80 μm, and is also preferably not more than 200 μm, more preferably not more than 170 μm and even more preferably not more than 150 μm.

Examples of commercially available products of the transparent synthetic resin film include "LUMIRROR T60" (polyethylene terephthalate) available from Toray Industries, Inc., "TAIKO FE2001" (corona-treated polyethylene terephthalate) available from Futamura Chemical Co, Ltd., "PVC80B P" (polyvinyl chloride) available from Lintec Corporation, "KINATH KEE 70CA" (polyethylene) available from Lintec Corporation, "YUPO SG90 PAT1" (polypropylene) available from Lintec Corporation and "BONYL RX" (nylon) available from Kohjin Film & Chemicals Co., Ltd., etc.

(Analog Printing)

The printed recording medium 1' used in the step 1 is provided by forming characters or images on a recording medium by analog printing. The analog printing is a plate printing method that needs the use of an ordinary printing plate. Examples of the analog printing include gravure printing, flexographic printing, offset printing, screen printing, etc. Of these printing methods, preferred is at least one method selected from the group consisting of gravure printing, flexographic printing and offset printing.

The analog printing may be either solid image printing in which a solid image is formed over an entire surface of the recording medium, or non-solid image printing in which characters or images are formed on a partial surface of the recording medium.

The color of the ink used in the analog printing is not particularly limited. In the case where the ink-jet printing is conducted by a color printing method, from the viewpoint of improving clarity of a color image-bearing surface formed by the ink-jet printing, the color of the ink used in the analog printing is preferably K (black), W (white) or Y (yellow), more preferably W (white) or Y (yellow), and even more preferably W (white). In addition, in the case where variable data are additionally printed on the analog printed image-bearing surface by the ink-jet printing, the color of the ink used in the analog printing may be C (cyan), M (magenta), Y (yellow), K (black), a special color (S), W (white) or the like.

The ink used in the analog printing contains a colorant such as a pigment and a dye, a vehicle such as a polymer and a solvent, and assistants (additives). From the viewpoint of exhibiting the effect of improving hiding power and adhesion properties of characters or images formed by the ink-jet printing, the ink used in the analog printing preferably contains at least one material selected from the group consisting of a polyamide, a polyurethane, a nitrocellulose, a polyethylene wax and a rosin-modified resin as a solid component of the ink.

The colorant contained in the ink used in the analog printing is preferably a pigment, more preferably at least one pigment selected from the group consisting of an inorganic pigment and an organic pigment, and even more preferably an organic pigment, from the viewpoint of improving weather resistance, hiding power and adhesion properties of characters or images formed by the ink-jet printing. Examples of the inorganic pigment include carbon blacks, metal oxides such as titanium oxide, zinc oxide, alumina, magnesium oxide, iron oxide and chromium oxide, ultramarine blue, Prussian blue, chrome yellow, etc. Examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments and quinophthalone pigments.

The components contained in the ink used in the analog printing may be appropriately selected depending upon the printing method used therefor. For example, the ink for gravure printing preferably contains at least one material selected from the group consisting of a polyamide, a polyurethane, a nitrocellulose and a polyethylene wax. For example, the ink for flexographic printing preferably contains a polyethylene wax. For example, the ink for offset printing preferably contains a rosin-modified resin. As the ink for the analog printing, there may be used either an oil-based ink or an aqueous ink.

Meanwhile, the "oil-based ink" as used herein means an ink having an organic solvent content of not less than 50% by mass, and the "aqueous ink" as used herein means an ink having a water content of not less than 50% by mass.

The characters or images formed by the analog printing are not particularly limited. From the viewpoint of improving clarity of the characters or images formed by the ink-jet printing, solid image printing is preferably used for the analog printing.

From the viewpoint of improving clarity of the characters or images formed by the ink-jet printing, the printed recording medium 1' is preferably obtained by the method in which after forming the characters or images on a recording medium by the analog printing, the ink present on the analog printed image-bearing surface is dried. As the drying method, there may be mentioned a method of applying heat energy or hot air to the image-bearing surface using a heater, etc.

<Discharge Treatment>

In the step 1, the discharge treatment is conducted under the following conditions.

Discharge Treatment Conditions:

Discharge treatment quantity in terms of an integrated irradiation quantity of electric energy: not less than 0.5 kW·min/m$^2$ and not more than 5.5 kW·min/m$^2$; and Discharge treatment rate in terms of a transportation speed of the printed recording medium: not less than 1 m/min and not more than 100 m/min.

Examples of the aforementioned discharge treatment include corona discharge treatment, arc discharge treatment, glow discharge treatment, etc. Among these discharge treatments, from the viewpoint of subjecting the image-bearing surface to fine uniform discharge treatment to improve hiding power and adhesion properties of characters or images printed thereon, preferred is at least one treatment selected from the group consisting of glow discharge treatment and corona discharge treatment, and more preferred is glow discharge treatment. By conducting the discharge treatment under the aforementioned conditions, a hydrophilic functional group can be introduced into the polymer included in the image-bearing surface of the printed recording medium 1' on which the characters or images are formed by the analog printing while suppressing deterioration in characteristics of the image-bearing surface and deformation of the recording medium, so that the image-bearing surface can be improved in wettability to the ink. As a result, it is considered that the water-based ink used in the ink-jet printing in the subsequent step 2 is enhanced in affinity to the analog printed image-bearing surface, so that the characters or images printed thereon can be improved in hiding power and adhesion properties.

(Glow Discharge Treatment)

As the glow discharge treatment, there may be mentioned such a method in which the printed recording medium 1' is placed in a space including helium, neon, argon, nitrogen, oxygen or air, etc., and exposed to a plasma generated therein by glow discharge to thereby introduce a hydrophilic functional group containing oxygen, nitrogen, etc., into the image-bearing surface of the printed recording medium 1'. In the case where an inert gas such as neon and argon is present under a low pressure, it is considered that radicals are produced on the image-bearing surface of the printed recording medium 1' by the plasma generated. Thereafter, when the image-bearing surface is exposed to air, it is considered that the radicals are combined with oxygen in the air, so that a hydrophilic functional group such as a hydroxy group, a carbonyl group, a carboxy group and an amino group can be introduced into the image-bearing surface.

The glow discharge treatment is preferably atmospheric pressure glow discharge treatment that is conducted under atmospheric pressure from the viewpoint of improving operability of the treatment. The discharge gas used in the atmospheric pressure glow discharge treatment may be a mixed gas such as atmospheric air, and is preferably an inert gas, more preferably at least one inert gas selected from the group consisting of rare gases such as helium and argon, and nitrogen gas, and even more preferably nitrogen gas.

The glow discharge treatment may be carried out using a commercially available glow discharge apparatus. Examples of the commercially available glow discharge apparatus include an atmospheric pressure plasma modification apparatus "Tough Plasma FPE20" (tradename) available from Fuji Machine Manufacturing Co., Ltd., etc.

When conducting the glow discharge treatment, the discharge treatment quantity in terms of an integrated irradiation quantity of electric energy is not less than 0.5 kW·min/m$^2$, preferably not less than 1.0 kW·min/m$^2$, more preferably not less than 1.5 kW·min/m$^2$, even more preferably not less than 2.0 kW·min/m$^2$ and further even more preferably not less than 3.0 kW·min/m$^2$ from the viewpoint of improving hiding power and adhesion properties of the printed characters or images, and is also not more than 5.5 kW·min/m$^2$, preferably not more than 5.0 kW·min/m$^2$, more preferably not more than 4.5 kW·min/m$^2$ and even more preferably not more than 4.0 kW·min/m$^2$ from the viewpoint of enhancing productivity of the printed material and improving quality of the printed characters or images.

(Corona Discharge Treatment)

As the corona discharge treatment, there may be mentioned such a method in which a high voltage of several thousands of volts is applied between a metal roll connected to ground and a wire-like electrode that is spaced by several mm apart from the metal roll to generate corona discharge therebetween. The printed recording medium 1' is placed between the electrode and the metal roll between which corona discharge is being generated, and allowed to undergo corona discharge treatment, to thereby improve wettability of the image-bearing surface of the printed recording medium 1'.

The corona discharge treatment may be carried out using a commercially available corona discharge apparatus. Examples of the commercially available corona discharge apparatus include a corona surface modification test equipment "TEC-4AX" (tradename) available from KASUGA DENKI, Inc., etc.

When conducting the corona discharge treatment, the discharge treatment quantity in terms of an integrated irradiation quantity of electric energy is not less than 0.5 kW·min/m$^2$, preferably not less than 0.8 kW·min/m$^2$, more preferably not less than 1.0 kW·min/m$^2$, even more preferably not less than 1.5 kW·min/m$^2$ and further even more preferably not less than 2.0 kW·min/m$^2$ from the viewpoint of improving hiding power and adhesion properties of the printed characters or images, and is also not more than 5.5 kW·min/m$^2$, preferably not more than 5.0 kW·min/m$^2$, more preferably not more than 4.5 kW·min/m$^2$, even more preferably not more than 4.0 kW·min/m$^2$, further even more preferably not more than 3.0 kW·min/m$^2$ and still further even more preferably not more than 2.5 kW·min/m$^2$ from the viewpoint of enhancing productivity of the printed material and improving quality of the printed characters or images.

When the discharge treatment quantity of the glow discharge treatment or the corona discharge treatment is the aforementioned lower limit or more, there can be attained the effects of (1) improving wettability of the analog printed image-bearing surface by removal of stains thereon, (2) improving adhesion properties of the analog printed image-bearing surface by roughening the image-bearing surface, (3) improving wettability of the analog printed image-bearing surface by introducing a hydrophilic functional group into the polymer contained in the analog printed image-bearing surface, and (4) improving penetrability of the water-based ink into the analog printed image-bearing surface by forming the analog printed image-bearing surface into a fine porous structure. As a result, it is considered that the resulting characters or images can be improved in hiding power and adhesion properties.

In addition, when the discharge treatment quantity of the glow discharge treatment or the corona discharge treatment is the aforementioned upper limit or less, the resulting printed recording medium 1 can be prevented from suffering from formation of the rough image-bearing surface, and it is possible to obtain a printed material on which good ink dots are formed by the ink-jet printing in the subsequent step 2 while suppressing deterioration in characteristics of the analog printed image-bearing surface and deformation of the recording medium.

The discharge treatment rate in terms of a transportation speed of the printed recording medium is not less than 1 m/min, preferably not less than 10 m/min and more preferably not less than 20 m/min from the viewpoint of enhancing productivity of the resulting printed material, and is also not more than 100 m/min, preferably not more than 80 m/min and more preferably not more than 60 m/min from the viewpoint of improving quality of the printed characters or images.

The aforementioned discharge treatment may be applied to an entire portion of the image-bearing surface of the printed recording medium 1'. However, in the case where the water-based ink is superimposed on a part of the image-bearing surface of the printed recording medium 1 upon conducting the ink-jet printing in the subsequent step 2, the discharge treatment may be applied to only the part of the image-bearing surface of the printed recording medium 1 on which the water-based ink is superimposed upon conducting the ink-jet printing.

The surface free energy (wetting tension) of the image-bearing surface of the printed recording medium 1' used in the step 1, i.e., the image-bearing surface before being subjected to the discharge treatment, is preferably not less than 5 mN/m, more preferably not less than 10 mN/m and even more preferably not less than 15 mN/m, and is also preferably less than 30 mN/m, more preferably not more than 28 mN/m, even more preferably not more than 25 mN/m and further even more preferably not more than 20 mN/m, from the viewpoint of improving hiding power and adhesion properties of the printed characters or images.

The surface free energy (wetting tension) of the image-bearing surface of the printed recording medium 1 obtained in the step 1, i.e., the image-bearing surface after being subjected to the discharge treatment, is preferably not less than 30 mN/m, more preferably not less than 33 mN/m, even more preferably not less than 35 mN/m, further even more preferably not less than 38 mN/m and still further even more preferably not less than 40 mN/m from the viewpoint of improving hiding power and adhesion properties of the printed characters or images, and is also preferably not more than 60 mN/m, more preferably not more than 55 mN/m and even more preferably not more than 50 mN/m from the viewpoint of enhancing productivity of the resulting printed material and improving quality of the printed characters or images.

The difference between the surface free energy of the printed recording medium 1 and the surface free energy of the printed recording medium 1' is preferably not less than 10 mN/m, more preferably not less than 13 mN/m, even more preferably not less than 15 mN/m and further even more preferably not less than 20 mN/m from the viewpoint of improving hiding power and adhesion properties of the printed characters or images, and is also preferably not more than 32 mN/m and more preferably not more than 30 mN/m from the viewpoint of enhancing productivity of the resulting printed material and improving quality of the printed characters or images.

The surface free energy (wetting tension) may be measured by the method described in Examples below.

(Step 2)

The step 2 is the step of further forming characters or images on the image-bearing surface of the printed recording medium 1 obtained in the step 1 by ink-jet printing using a water-based ink to obtain the printed material as aimed. In the step 2, the water-based ink is preferably superimposed on at least a part of the image-bearing surface of the printed recording medium 1, and the water-based ink is more preferably superimposed on an entire portion of the image-bearing surface of the printed recording medium 1.

The water-based ink used in the present invention (hereinafter also referred to merely as an "ink") is preferably in the form of a water-based ink containing at least a pigment (A) and water from the viewpoint of improving weather resistance and water resistance of the resulting printed material. In addition, the water-based ink may also contain a polymer (B), an organic solvent (C), a surfactant (D) and other components, if required. Meanwhile, the term "water-based" as used in the present specification means that water has a largest content among components of a dispersing medium contained in the ink.

<Water-Based Ink>
[Pigment (A)]

The pigment (A) used in the present invention may be either an inorganic pigment and an organic pigment.

Examples of the inorganic pigment include carbon blacks, metal oxides and the like. The carbon blacks are preferably used as a pigment for black inks. The carbon blacks may include furnace blacks, thermal lamp blacks, acetylene blacks and channel blacks. As a pigment for white inks, there may be used metal oxides such as titanium oxide, zinc oxide, silica, alumina and magnesium oxide, etc. Among these pigments for white inks, preferred is titanium oxide.

Examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments and quinophthalone pigments. The organic pigments are preferably used for chromatic inks. The hue of the organic pigments used in the present invention is not particularly limited, and any chromatic pigment having a yellow color, a magenta color, a cyan color, a red color, a blue color, an orange color, a green color, etc., may be used in the present invention.

The average particle size of the respective pigments used for the black ink and chromatic inks is preferably not less than 60 nm and not more than 180 nm from the viewpoint of improving tinting power and dispersion stability of the resulting inks. The average particle size of the pigment used for the white ink is preferably not less than 150 nm and not more than 400 nm from the viewpoint of improving hiding power (whiteness) of the resulting white ink.

The pigment (A) used in the present invention may be in the form of at least one pigment selected from the group consisting of a self-dispersible pigment, and particles formed by dispersing the pigment with a polymer (B).

(Self-Dispersible Pigment)

The self-dispersible pigment that may be used in the present invention means a pigment onto a surface of which at least one hydrophilic functional group (including an anionic hydrophilic group such as a carboxy group and a sulfonic group or a cationic hydrophilic group such as a quaternary ammonium group) is bonded either directly or through the other atom group such as an alkanediyl group having 1 to 12 carbon atoms to thereby render the pigment dispersible in an aqueous medium without using a surfactant or a resin. In order to form the pigment into the self-dispersible pigment, for example, a necessary amount of the hydrophilic functional group may be chemically bonded to the surface of the pigment by an ordinary method. Specific examples of commercially available products of the self-dispersible pigment include "CAB-O-JET 200", "CAB-O-JET 300", "CAB-O-JET 352K", "CAB-O-JET 250A", "CAB-O-JET 260M", "CAB-O-JET 270Y", "CAB-O-JET 450A", "CAB-O-JET 465M", "CAB-O-JET 470Y" and "CAB-O-JET 480V" available from Cabot Japan K.K.; "BONJET CW-1", "BONJET CW-2", etc., available from Orient Chemical Industries Co., Ltd.; "Aqua-Black 162", etc., available from Tokai Carbon Co., Ltd.; and "SENSIJET BLACK SDP100", "SENSIJET BLACK SDP1000", "SENSIJET BLACK SDP2000", etc., available from SENSIENT INDUSTRIAL COLORS. The self-dispersible pigment is preferably used in the form of a pigment water dispersion prepared by dispersing the pigment in water.

(Particles Formed by Dispersing Pigment (A) with Polymer (B))

In the present invention, the pigment (A) may be used in the form of particles formed by dispersing the pigment (A) with the below-mentioned polymer (B). Examples of the method of preparing the particles formed by dispersing the pigment (A) with the polymer (B) include (1) a method in which the pigment and the polymer are kneaded together, and then the resulting kneaded material is dispersed in a medium such as water; (2) a method in which the pigment and the polymer are stirred together in a medium such as water to disperse the pigment in the medium such as water; (3) a method in which a polymer raw material such as monomers and the pigment are mechanically dispersed to polymerize the polymer raw material in such a dispersed state, and then the pigment is dispersed in a medium such as water with the resulting polymer; and the like.

The particles formed by dispersing the pigment (A) with the polymer (B) are preferably in the form of water-insoluble polymer particles containing the pigment (A). The configuration of the water-insoluble polymer particles containing the pigment (A) is not particularly limited, and the polymer particles may have any configuration as long as the particles are formed of at least the pigment (A) and the water-insoluble polymer. Examples of the configuration of the water-insoluble polymer particles containing the pigment (A) include the particle configuration in which the pigment (A) is enclosed (encapsulated) in the water-insoluble polymer, the particle configuration in which the pigment (A) is uniformly dispersed in the water-insoluble polymer, the particle configuration in which the pigment (A) is exposed onto a surface of the respective water-insoluble polymer particles, as well as a mixed configuration of these particle configurations.

In addition, from the viewpoint of improving storage stability of the resulting water-based ink, a crosslinking agent may be added to the particles formed by dispersing the pigment (A) with the polymer (B) to subject the polymer (B) to crosslinking reaction therewith. Examples of the crosslinking agent include compounds containing two or more functional groups that are capable of reacting with functional groups contained in the polymer (B). For example, in the case where the polymer (B) contains carboxy groups, as the crosslinking agent, there are preferably used polyhydric alcohol polyglycidyl ether compounds.

In the case where the water-based ink is any of a black ink and chromatic inks, the average particle size of the particles formed by dispersing the pigment in the water-based ink with the polymer (B) (or the average particle size of the water-insoluble polymer particles containing the pigment (A)) is preferably not less than 60 nm and more preferably not less than 80 nm, and is also preferably not more than 250 nm, more preferably not more than 220 nm, even more preferably not more than 200 nm and further even more preferably not more than 180 nm, from the viewpoint of improving hiding power and adhesion properties of the printed characters or images.

In addition, in the case where the water-based ink is a white ink, the average particle size of the aforementioned particles is preferably not less than 150 nm and more preferably not less than 200 nm, and is also preferably not more than 400 nm, more preferably not more than 350 nm, even more preferably not more than 300 nm and further even more preferably not more than 280 nm, from the viewpoint of improving hiding power and adhesion properties of the printed characters or images. The average particle size of the particles formed by dispersing the pigment in the water-based ink with the polymer (B) may be measured by the method described in Examples below.

[Polymer (B)]

In the present invention, from the viewpoint of improving dispersibility of the pigment as well as from the viewpoint of improving hiding power and adhesion properties of the resulting printed characters or images, the water-based ink preferably further contains the polymer (B). Examples of the polymer (B) include condensation-based resins such as polyurethanes and polyesters, and vinyl-based polymers such as acrylic resins, styrene-based resins, styrene-acrylic resins, butadiene-based resins, styrene-butadiene-based resins, vinyl chloride-based resins, vinyl acetate-based resins and acrylic silicone-based resins. Among these polymers, preferred are vinyl-based polymers.

The weight-average molecular weight of the polymer (B) is preferably not less than 10,000, more preferably not less than 20,000, even more preferably not less than 30,000, further even more preferably not less than 40,000 and still further even more preferably not less than 50,000, and is also preferably not more than 2,500,000, more preferably not more than 1,000,000 and even more preferably not more than 500,000, from the viewpoint of improving dispersibility of the pigment as well as from the viewpoint of improving hiding power and adhesion properties of the resulting printed characters or images. The weight-average molecular weight of the polymer (B) may be measured by the method described in Examples below.

The acid value of the polymer (B) is preferably not less than 50 mgKOH/g, more preferably not less than 60 mgKOH/g and even more preferably not less than 70 mgKOH/g, and is also preferably not more than 300 mgKOH/g, more preferably not more than 250 mgKOH/g, even more preferably not more than 200 mgKOH/g, further even more preferably not more than 150 mgKOH/g and still further even more preferably not more than 100 mgKOH/g, from the viewpoint of improving dispersion stability of the pigment as well as from the viewpoint of improving hiding power and adhesion properties of the resulting printed characters or images.

The acid value of the polymer (B) may be calculated from the mass ratio between the monomers constituting the polymer (B). Alternatively, the acid value of the polymer (B) may also be determined by the method in which the polymer (B) is dissolved in an appropriate organic solvent (for example, such as MEK) or swelled therewith, and then subjected to titration.

The polymer (B) used in the present invention may be used as a pigment dispersing polymer (B-1) for dispersing the pigment (A) and a fixing aid polymer (B-2) for improving rub fastness of the characters or images formed on the printed material. These polymers (B-1) and (B-2) may also be used in combination with each other.

[Pigment Dispersing Polymer (B-1)]

As the pigment dispersing polymer (B-1) used in the present invention for dispersing the pigment, there may be mentioned condensation-based resins such as polyesters and polyurethanes, and vinyl-based polymers, etc. Among these polymers, from the viewpoint of improving dispersion stability of the pigment, preferred are vinyl-based polymers that are obtained by addition-polymerizing a vinyl monomer (such as vinyl compounds, vinylidene compounds and vinylene compounds). The pigment dispersing polymer (B-1) used herein may be in the form of either an appropriately synthetized product or a commercially available product.

In the case where the pigment dispersing polymer (B-1) is in the form of a vinyl-based polymer, the vinyl-based polymer preferably contains one or more constitutional units selected from the group consisting of a constitutional unit derived from an ionic monomer, a constitutional unit derived from a hydrophobic monomer and a constitutional unit derived from a hydrophilic nonionic monomer, and more preferably contains two or more constitutional units selected from the group consisting of the aforementioned constitutional units. Examples of a combination of the two or more constitutional units derived from the aforementioned monomers include a combination of the constitutional units derived from the ionic monomer and the hydrophobic monomer, and a combination of the constitutional units derived from the ionic monomer, the hydrophobic monomer and the hydrophilic nonionic monomer.

The vinyl-based polymer used in the present invention is preferably in the from of a water-insoluble polymer, and may be produced, for example, by subjecting a monomer mixture containing the ionic monomer, the hydrophobic monomer and the hydrophilic nonionic monomer to addition polymerization by conventionally known methods.

The term "water-insoluble" as used herein means that when a polymer is dried to a constant weight at 105° C. for 2 hours and then dissolved in 100 g of water at 25° C. until reaching a saturation concentration thereof, the solubility in water of the polymer is not more than 10 g. The solubility in water of the water-insoluble polymer is preferably not more than 5 g and more preferably not more than 1 g.

Examples of the ionic monomer include anionic monomers such as carboxylic acid monomers, sulfonic acid monomers and phosphoric acid monomers; and cationic monomers such as N,N-dimethylaminoethyl methacrylate and N,N-dimethylaminoethyl acrylamide. Meanwhile, the ionic monomer may also include those monomers that have no ionicity under neutral conditions, such as acids and amines, but are converted into ions under acid or alkaline conditions.

Examples of the hydrophobic monomer include an alkyl (meth)acrylate having not less than 1 and not more than 22 carbon atoms, a styrene-based monomer, an aromatic group-containing (meth)acrylate and a styrene-based macromer. The styrene-based macromer is a compound containing a polymerizable functional group at one terminal end thereof and having a number-average molecular weight of not less than 500 and not more than 100,000.

Examples of the hydrophilic nonionic monomer include polyalkylene glycol mono(meth)acrylates such as polyethylene glycol mono(meth)acrylate; and alkoxy polyalkylene glycol mono(meth)acrylates such as methoxy polyethylene glycol mono(meth)acrylate and octoxy polyethylene glycol mono(meth)acrylate.

The weight-average molecular weight of the pigment dispersing polymer (B-1) is preferably not less than 20,000, more preferably not less than 30,000, even more preferably not less than 40,000 and further even more preferably not less than 50,000, and is also preferably not more than 500,000, more preferably not more than 400,000 and even more preferably not more than 300,000, from the viewpoint of improving dispersibility of the pigment as well as from the viewpoint of improving hiding power and adhesion properties of the resulting printed characters or images.

Specific examples of commercially available products of the vinyl-based polymers include polyacrylic acids such as "ARON AC-10SL" available from Toagosei Co., Ltd., and styrene-acrylic resins such as "JONCRYL 67", "JONCRYL 611", "JONCRYL 678", "JONCRYL 680", "JONCRYL 690" and "JONCRYL 819" all available from BASF Japan, Ltd., etc.

[Fixing Aid Polymer (B-2)]

The fixing aid polymer (B-2) is preferably used in the form of pigment-free polymer particles. As the components of the fixing aid polymer (B-2), there may be mentioned condensation-based resins such as polyurethanes and polyesters, and vinyl-based polymers such as acrylic resins, styrene-based resins, styrene-acrylic resins, butadiene-based resins, styrene-butadiene-based resins, vinyl chloride-based resins, vinyl acetate-based resins and acrylic-silicone-based resins. Among these polymers, from the viewpoint of promoting drying of the ink on a recording medium as well as from the viewpoint of improving hiding power, adhesion properties and rub fastness of the characters or images formed on the printed material, preferred are acrylic resins.

In addition, from the viewpoint of enhancing productivity of the resulting water-based ink, the fixing aid polymer (B-2) is preferably used in the form of a dispersion containing the polymer particles. The fixing aid polymer (B-2) may be either an appropriately synthetized product or a commercially available product.

The fixing aid polymer (B-2) may be produced by copolymerizing a mixture of the monomers by conventionally known polymerization methods. Examples of the preferred polymerization methods include an emulsion polymerization method, a suspension polymerization method, etc. Among these polymerization methods, more preferred is an emulsion polymerization method.

Examples of the commercially available products of the fixing aid polymer (B-2) include acrylic resins such as "Neocryl A1127" (anionic self-crosslinkable aqueous acrylic resin) available from DSM NeoResins, Inc., and "JONCRYL 390" available from BASF Japan, Ltd.; urethane resins such as "WBR-2018" and "WBR-2000U" both available from Taisei Fine Chemical Co., Ltd.; styrene-butadiene resins such as "SR-100" and "SR-102" both available from Nippon A & L Inc.; styrene-acrylic resins such as "JONCRYL 7100", "JONCRYL 7600", "JONCRYL 537J", "JONCRYL PDX-7164", "JONCRYL 538J" and "JONCRYL 780" all available from BASF Japan, Ltd.; and vinyl chloride-based resins such as "VINYBLAN 700" and "VINYBLAN 701" both available from Nissin Chemical Co., Ltd., etc.

The fixing aid polymer (B-2) may be used in the form of particles dispersed in water. The dispersion containing particles of the fixing aid polymer (B-2) serves for forming a film on a recording medium to improve adhesion properties of the characters or images formed on the printed material.

The weight-average molecular weight of the fixing aid polymer (B-2) used in the present invention is preferably not less than 10,000, more preferably not less than 20,000 and even more preferably not less than 50,000, and is also preferably not more than 2,500,000 and more preferably not more than 1,000,000, from the viewpoint of improving hiding power, adhesion properties and rub fastness of the characters or images formed on the printed material.

In addition, the average particle size of particles of the fixing aid polymer (B-2) in the dispersion containing the particles of the fixing aid polymer (B-2) or in the resulting ink is preferably not less than 10 nm, more preferably not less than 30 nm and even more preferably not less than 50 nm, and is also preferably not more than 300 nm, more preferably not more than 200 nm, even more preferably not more than 150 nm and further even more preferably not more than 130 nm, from the viewpoint of improving storage stability of the resulting ink.

[Organic Solvent (C)]

The organic solvent (C) has a boiling point of not lower than 90° C. and lower than 250° C. from the viewpoint of suppressing color migration of the water-based ink in the form of a black ink or a chromatic ink and deformation of the recording medium as well as from the viewpoint of improving ejection properties of the ink upon high-speed printing. From the same viewpoint as described above, the boiling point of the organic solvent (C) is preferably not lower than 130° C., more preferably not lower than 140° C. and even more preferably not lower than 150° C., and is also preferably not higher than 245° C., more preferably not higher than 240° C. and even more preferably not higher than 235° C.

As such an organic solvent (C), from the viewpoint of improving storage stability and ejection properties of the resulting ink as well as from the viewpoint of improving hiding power and adhesion properties of the printed characters or images, there may be used a polyhydric alcohol (c-1) and the like.

[Polyhydric Alcohol (c-1)]

Examples of the polyhydric alcohol (c-1) include compounds in the form of a hydrocarbon having not less than 2 and not more than 6 carbon atoms to which two or more hydroxy groups are bonded, and compounds obtained by subjecting the hydroxy groups to condensation reaction (e.g., polyethylene glycols). The number of carbon atoms in the hydrocarbon is preferably not less than 2 and not more than 6.

Examples of the polyhydric alcohol (c-1) include 1,2-alkanediols such as ethylene glycol (boiling point (b.p.) 197° C.), propylene glycol (b.p. 188° C.), 1,2-butanediol (b.p. 193° C.), 1,2-pentanediol (b.p. 206° C.) and 1,2-hexanediol (b.p. 223° C.), diethylene glycol (b.p. 245° C.), polyethylene glycols, dipropylene glycol (b.p. 232° C.), 1,3-propanediol (b.p. 210° C.), 1,3-butanediol (b.p. 208° C.), 1,4-butanediol (b.p. 230° C.), 3-methyl-1,3-butanediol (b.p. 203° C.), 1,5-pentanediol (b.p. 242° C.), 2-methyl-2,4-pentanediol (b.p. 196° C.), 1,2,6-hexanetriol (b.p. 178° C.), 1,2,4-butanetriol (b.p. 190° C.), 1,2,3-butanetriol (b.p. 175° C.) and petriol (b.p. 216° C.).

Among these compounds as the polyhydric alcohol (c-1), from the viewpoint of improving storage stability and ejection properties of the resulting ink as well as from the viewpoint of improving hiding power and adhesion properties of the printed characters or images, preferred is at least one compound selected from the group consisting of alkanediols having not less than 2 and not more than 6 carbon atoms, such as propylene glycol, diethylene glycol and 1,2-hexanediol, and polypropylene glycols having a molecular weight of not less than 500 and not more than 1000, more preferred is at least one compound selected from the group consisting of 1,2-alkanediols having not less than 3 and not more than 4 carbon atoms, such as propylene glycol and diethylene glycol, and the aforementioned polypropylene glycols, and even more preferred is propylene glycol.

[Other Organic Solvents]

The organic solvent (C) may also contain, in addition to the aforementioned polyhydric alcohol (c-1), those organic solvents that may be usually compounded in the water-based ink, such as the other alcohols, alkyl ethers of the alcohols, glycol ethers, nitrogen-containing heterocyclic compounds such as N-methyl-2-pyrrolidone, amides, amines and sulfur-containing compounds.

Specific examples of the glycol ethers include alkylene glycol monoalkyl ethers and alkylene glycol dialkyl ethers. Among these glycol ethers, from the viewpoint of improving ejection properties of the resulting ink and obtaining a printed material that is free of color migration of the ink and deformation of the recording medium as well as from the viewpoint of satisfying both of good hiding power and adhesion properties of the printed characters or images, preferred are alkylene glycol monoalkyl ethers. The number of carbon atoms in an alkyl group of the alkylene glycol monoalkyl ethers is preferably not less than 1, more preferably not less than 2 and even more preferably not less than 3, and is also preferably not more than 6 and more preferably not more than 4. The alkyl group of the alkylene glycol monoalkyl ethers may be in the form of either a straight chain or a branched chain.

Specific examples of the preferred glycol ethers include at least one compound selected from the group consisting of ethylene glycol isopropyl ether, ethylene glycol propyl ether, diethylene glycol methyl ether, diethylene glycol isopropyl ether, diethylene glycol isobutyl ether and diethylene glycol butyl ether. Among these glycol ethers, more preferred is at least one compound selected from the group consisting of diethylene glycol isopropyl ether and diethylene glycol isobutyl ether.

In addition, 1,6-hexanediol (b.p. 250° C.), triethylene glycol (b.p. 285° C.), tripropylene glycol (b.p. 273° C.), polypropylene glycols (b.p. not lower than 250° C.), glycerin (b.p. 290° C.), etc., may also be used in combination with the compound having a boiling point of lower than 250° C.

[Surfactant (D)]

The water-based ink used in the present invention preferably contains a surfactant (D) from the viewpoint of suppressing increase in viscosity of the resulting ink, improving ejection properties of the ink and obtaining a printed material that is free of color migration of the ink and deformation of the recording medium as well as from the viewpoint of satisfying both of good hiding power and adhesion properties of the printed characters or images. The surfactant (D) preferably includes a nonionic surfactant (d-1).

Examples of the nonionic surfactant (d-1) include (1) alkyl ethers, alkenyl ethers, alkynyl ethers or aryl ethers of polyoxyalkylenes which contain a saturated or unsaturated, linear or branched hydrocarbon group having not less than 8 and not more than 22 carbon atoms, and which are produced by adding ethyleneoxide, propyleneoxide or butyleneoxide (hereinafter also collectively referred to as an "alkyleneoxide") to a higher alcohol, a polyhydric alcohol or an aromatic alcohol, (2) esters of a higher alcohol and a polyvalent fatty acid, which contain a saturated or unsaturated, linear or branched hydrocarbon group having not less than 8 and not more than 22 carbon atoms, (3) polyoxyalkylene aliphatic amines containing a linear or branched alkyl group or alkenyl group having not less than 8 and not more than 20 carbon atoms, and (4) ester compounds of a higher fatty acid having not less than 8 and not more than 22 carbon atoms and a polyhydric alcohol, or compounds produced by adding an alkyleneoxide to the ester compounds.

Examples of commercially available products of the nonionic surfactant include "SURFYNOL" series products available from Air Products & Chemicals, Inc., "ACETYLENOL" series products available from Kawaken Fine Chemicals Co., Ltd., and "EMULGEN 120" (polyoxyethylene lauryl ether) available from Kao Corporation.

As the surfactant (D), there may also be used those surfactant other than the nonionic surfactant, e.g., such as an anionic surfactant, an amphoteric surfactant, a silicone-based surfactant and a fluorine-based surfactant.

[Contents of Respective Components in Water-Based Ink and Properties of Water-Based Ink]

The contents of the respective components in the water-based ink used in the present invention as well as various properties of the water-based ink are as follows.

(Content of Pigment (A))

The content of the pigment (A) in the respective black and chromatic water-based inks is preferably not less than 1% by mass, more preferably not less than 2% by mass and even more preferably not less than 3% by mass from the viewpoint of enhancing optical density of the water-based ink printed as well as from the viewpoint of improving hiding power of the printed characters or images, and is also preferably not more than 15% by mass, more preferably not more than 10% by mass and even more preferably not more than 8% by mass from the viewpoint of reducing viscosity of the water-based ink upon volatilization of the solvent therefrom as well as from the viewpoint of improving ejection properties of the water-based ink and adhesion properties of the printed characters or images.

The content of the pigment (A) in the white water-based ink is preferably not less than 4% by mass, more preferably not less than 6% by mass and even more preferably not less than 8% by mass from the viewpoint of improving hiding power of the printed characters or images, and is also preferably not more than 40% by mass, more preferably not more than 30% by mass, even more preferably not more than 20% by mass and further even more preferably not more than 15% by mass from the viewpoint of reducing viscosity of the water-based ink upon volatilization of the solvent therefrom as well as from the viewpoint of improving ejection properties of the water-based ink and adhesion properties of the printed characters or images.

(Content of Polymer (B))

The content of the polymer (B) in the water-based ink is preferably not less than 0.5% by mass, more preferably not less than 1% by mass and even more preferably not less than 1.5% by mass from the viewpoint of improving hiding power and adhesion properties of the printed characters or images, and is also preferably not more than 10% by mass, more preferably not more than 8% by mass and even more preferably not more than 6% by mass from the viewpoint of improving ejection properties of the resulting ink.

In the case where the polymer dispersing polymer (B-1) is used in combination with the fixing aid polymer (B-2), the content of the polymer (B) in the water-based ink as used herein means a total content of the pigment dispersing polymer (B-1) and the fixing aid polymer (B-2).

In addition, in the case where the polymer (B) is used as the pigment dispersing polymer (B-1), the content of the pigment dispersing polymer (B-1) in the water-based ink is preferably not less than 0.01% by mass, more preferably not less than 0.05% by mass and even more preferably not less than 0.1% by mass from the viewpoint of improving hiding power and adhesion properties of the printed characters or images, and is also preferably not more than 10% by mass, more preferably not more than 7% by mass, even more preferably not more than 5% by mass and further even more preferably not more than 3% by mass from the viewpoint of improving dispersion stability of the water-based ink.

Also, in the case where the polymer (B) is used as the fixing aid polymer (B-2) in the ink, the content of the fixing aid polymer (B-2) in the water-based ink is preferably not less than 0.9% by mass, more preferably not less than 1% by mass and even more preferably not less than 1.2% by mass from the viewpoint of improving hiding power and adhesion properties of the printed characters or images, and is also preferably not more than 10% by mass, more preferably not more than 6% by mass and even more preferably not more than 3% by mass from the viewpoint of improving dispersion stability of the water-based ink.

The mass ratio of the pigment (A) to the polymer (B) [pigment (A)/polymer (B)] in the water-based ink is preferably not less than 0.1, more preferably not less than 0.5, even more preferably not less than 1, further even more preferably not less than 1.5 and still further even more preferably not less than 2, and is also preferably not more than 9, more preferably not more than 7, even more preferably not more than 5 and further even more preferably not more than 4, from the viewpoint of improving dispersion stability of the water-based ink as well as from the viewpoint of improving hiding power and adhesion properties of the resulting printed characters or images.

(Content of Organic Solvent (C))

The content of the organic solvent (C) in the water-based ink is preferably not less than 15% by mass, more preferably not less than 20% by mass and even more preferably not less than 25% by mass, and is also preferably not more than 45% by mass, more preferably not more than 40% by mass and even more preferably not more than 35% by mass, from the viewpoint of suppressing color migration of the black or chromatic water-based ink and deformation of the recording medium as well as from the viewpoint of improving ejection properties of the ink upon high-speed printing.

The content of the polyhydric alcohol (c-1) in the water-based ink is preferably not less than 10% by mass, more preferably not less than 15% by mass and even more preferably not less than 20% by mass, and is also preferably not more than 45% by mass, more preferably not more than 40% by mass and even more preferably not more than 35% by mass, from the viewpoint of improving storage stability and ejection properties of the water-based ink as well as from the viewpoint of improving hiding power and adhesion properties of the printed characters or images.

The content of the polyhydric alcohol (c-1) in the organic solvent (C) is preferably not less than 60% by mass, more preferably not less than 70% by mass, even more preferably not less than 80% by mass and further even more preferably not less than 90% by mass from the viewpoint of improving storage stability and ejection properties of the water-based ink as well as from the viewpoint of improving hiding power and adhesion properties of the printed characters or images.

The content of a high-boiling organic solvent having a boiling point of not lower than 250° C. in the water-based ink used in the present invention is preferably not more than 5% by mass, more preferably not more than 4% by mass and even more preferably not more than 3% by mass from the viewpoint of imparting adequate drying properties to the water-based ink upon high-speed printing and preventing occurrence of color migration of the water-based ink.

(Content of Surfactant (D))

The content of the surfactant (D) in the water-based ink is preferably not less than 0.01% by mass, more preferably not less than 0.03% by mass, even more preferably not less than 0.05% by mass, further even more preferably not less than 0.1% by mass, still further even more preferably not less than 0.3% by mass and furthermore preferably not less than 0.5% by mass from the viewpoint of suppressing increase in viscosity of the resulting water-based ink, improving ejection properties of the ink and obtaining a printed material that is free of color migration of the ink and deformation of the recording medium as well as from the viewpoint of satisfying both of good hiding power and adhesion properties of the printed characters or images, and is also preferably not more than 3.0% by mass, more preferably not more than 2.0% by mass and even more preferably not more than 1.0% by mass from the same viewpoint as described above.

In the case where the discharge treatment is corona discharge treatment, the content of the surfactant (D) in the water-based ink is preferably not less than 0.01% by mass, more preferably not less than 0.03% by mass, even more preferably not less than 0.05% by mass, further even more preferably not less than 0.1% by mass, still further even more preferably not less than 0.3% by mass and furthermore preferably not less than 0.5% by mass from the viewpoint of improving hiding power of the printed characters or images. Also, in the case where the discharge treatment is corona discharge treatment, the content of the surfactant (D) in the water-based ink is preferably not more than 3.0% by mass, more preferably not more than 2.0% by mass, even more preferably not more than 1.0% by mass, further even more preferably not more than 0.5% by mass, still further even more preferably not more than 0.3% by mass and furthermore preferably not more than 0.1% by mass from the viewpoint of improving adhesion properties of the printed characters or images.

(Content of Water)

The content of water in the water-based ink is preferably not less than 35% by mass, more preferably not less than 40% by mass and even more preferably not less than 45% by mass, and is also preferably not more than 75% by mass, more preferably not more than 70% by mass and even more preferably not more than 65% by mass, from the viewpoint of improving ejection properties and storage stability of the water-based ink and obtaining a printed material that is free of color migration of the ink and deformation of the recording medium as well as from the viewpoint of satisfying both of good hiding power and adhesion properties of the printed characters or images.

(Other Components)

The water-based ink used in the present invention may also contain, in addition to the aforementioned components, various ordinary additives such as an antiseptic agent, a mildew-proof agent, a rust preventive and the like.

(Properties of Water-Based Ink)

The static surface tension of the water-based ink as measured at 20° C. is preferably not less than 20 mN/m, more preferably not less than 23 mN/m and even more preferably not less than 25 mN/m from the viewpoint of improving hiding power and adhesion properties of the printed characters or images, and is also preferably not more than 45 mN/m, more preferably not more than 40 mN/m, even more preferably not more than 35 mN/m and further even more preferably not more than 30 mN/m from the same viewpoint as described above.

In the case where the discharge treatment is glow discharge treatment, the static surface tension of the water-based ink as measured at 20° C. is preferably not less than 20 mN/m, more preferably not less than 23 mN/m and even more preferably not less than 25 mN/m from the viewpoint of improving hiding power and adhesion properties of the printed characters or images, and is also preferably not more than 45 mN/m, more preferably not more than 40 mN/m, even more preferably not more than 35 mN/m and further even more preferably not more than 30 mN/m from the same viewpoint as described above.

In the case where the discharge treatment is corona discharge treatment, the static surface tension of the water-based ink as measured at 20° C. is preferably not less than 20 mN/m, more preferably not less than 25 mN/m, even more preferably not less than 30 mN/m and further even more preferably not less than 35 mN/m from the viewpoint of improving adhesion properties of the printed characters or images. Also, in the case where the discharge treatment is corona discharge treatment, the static surface tension of the water-based ink as measured at 20° C. is preferably not more than 45 mN/m, more preferably not more than 40 mN/m, even more preferably not more than 35 mN/m and further even more preferably not more than 30 mN/m from the viewpoint of improving hiding power of the printed characters or images.

Furthermore, in the case where the discharge treatment is corona discharge treatment, the static surface tension of the water-based ink as measured at 20° C. is preferably not less than 20 mN/m, more preferably not less than 25 mN/m, even more preferably not less than 30 mN/m and further even more preferably not less than 35 mN/m from the viewpoint of satisfying both of good hiding power and adhesion properties of the printed characters or images, and is also preferably not more than 45 mN/m and more preferably not more than 40 mN/m from the same viewpoint as described above.

The viscosity of the water-based ink as measured at 32° C. is preferably not less than 2.0 mPa·s, more preferably not less than 3.0 mPa·s and even more preferably not less than 4.0 mPa·s, and is also preferably not more than 12 mPa·s, more preferably not more than 9.0 mPa·s and even more preferably not more than 7.0 mPa·s, from the viewpoint of improving ejection properties of the water-based ink as well as from the viewpoint of improving hiding power and adhesion properties of the printed characters or images.

The pH value of the water-based ink as measured at 20° C. is preferably not less than 7.0, more preferably not less than 8.0, even more preferably not less than 8.5 and further even more preferably not less than 8.7 from the viewpoint of improving storage stability and ejection properties of the resulting ink as well as from the viewpoint of obtaining a printed material that is free of color migration of the ink and deformation of the recording medium. Also the pH value of the water-based ink as measured at 20° C. is preferably not more than 11.0 and more preferably not more than 10.0 from the viewpoint of improving resistance of members to the water-based ink and suppressing skin irritation.

Meanwhile, the static surface tension, viscosity and pH value may be measured by the respective methods described in Examples below.

<Ink-Jet Printing Method>

The ink-jet printing according to the present invention is preferably conducted by the following method.

The ink-jet printing method of the present invention includes the step of ejecting the water-based ink onto the printed recording medium 1 obtained in the aforementioned step 1 by an ink-jetting method to form characters or images thereon.

In the printed material obtained by the ink-jet printing method of the present invention, the ink-jet printing is conducted on at least a part of the analog printed image-bearing surface using the water-based ink, and the analog printed image-bearing surface has been subjected to discharge treatment. As described above, the printed recording medium 1 includes the image-bearing surface on which the characters or images have been formed by the analog printing, and has been preferably subjected to the discharge treatment such that the surface free energy of the image-bearing surface is not less than 30 m/Nm.

The water-based ink is preferably ejected and allowed to adhere onto the printed recording medium 1 such that the water-based ink is superimposed on at least a part of the image-bearing surface of the printed recording medium 1, and more preferably ejected and allowed to adhere onto the printed recording medium 1 such that the water-based ink is superimposed on an entire portion of the image-bearing surface of the printed recording medium 1.

[Printing Method]

The ink-jet printing may be either color printing or monochrome printing. In the color printing, there may be used inks whose colors are C (cyan), M (magenta), Y (yellow), K (black), a special color (S), W (white) and the like. In the case where the color of the ink used in the analog printing is W (white) or Y (yellow), the color of the ink used in the ink-jet printing is preferably at least one color selected from the group consisting of C (cyan), M (magenta), K (black) and a special color (S) from the viewpoint of improving clarity of the characters or images formed by the ink-jet printing. In addition, in the case where the color of the ink used in the analog printing is W (white), the color of the ink used in the ink-jet printing is preferably at least one color selected from the group consisting of C (cyan), M (magenta), Y (yellow), K (black) and a special color (S) from the viewpoint of improving clarity of the characters or images formed by the ink-jet printing.

The amount of the ink droplets ejected is preferably not less than 1 pL, more preferably not less than 3 pL and even more preferably not less than 5 pL, and is also preferably not more than 20 pL, more preferably not more than 15 pL and even more preferably not more than 10 pL, as calculated per one ink droplet ejected, from the viewpoint of maintaining accuracy of impact positions of the ink droplets as well as from the viewpoint of improving quality of the printed characters or images.

The print head resolution is preferably not less than 400 dpi (dot/inch), more preferably not less than 500 dpi and even more preferably not less than 550 dpi.

From the viewpoint of reducing viscosity of the water-based ink and improving ejection properties of the ink, the inside temperature of the print head is preferably controlled to not lower than 20° C., more preferably not lower than 25° C. and even more preferably not lower than 30° C., and is also preferably controlled to not higher than 45° C., more preferably not higher than 40° C. and even more preferably not higher than 38° C.

The temperature of the surface of the recording medium which is opposed to an ink-ejection region of the print head, i.e., the temperature of the image-bearing surface of the printed recording medium 1, may be room temperature. However, the image-bearing surface is preferably maintained at a temperature of not lower than 35° C., more preferably not lower than 40° C., even more preferably not lower than 45° C., further even more preferably not lower than 50° C. and still further even more preferably not lower than 55° C. from the viewpoint of improving a printing speed as well as from the viewpoint of improving hiding power of the resulting printed characters or images, and is also preferably maintained at a temperature of not higher than 80° C., more preferably not higher than 75° C., even more preferably not higher than 70° C. and further even more preferably not higher than 65° C. from the viewpoint of suppressing deformation of the recording medium. As the method of controlling the temperature of the image-bearing surface of the printed recording medium 1, there may be mentioned a method of blowing hot air onto the image-bearing surface to heat the image-bearing surface, a method of allowing a heater to approach to the image-bearing surface to heat the image-bearing surface, a method of bringing a heater into contact with a surface of the printed recording medium 1 which is opposed to the analog printed image-bearing surface to heat the image-bearing surface, etc.

The printing speed in terms of a transportation speed of the printed recording medium is preferably not less than 10 m/min, more preferably not less than 20 m/min, even more preferably not less than 30 m/min, further even more preferably not less than 40 m/min, still further even more preferably not less than 50 m/min, furthermore preferably not less than 60 m/min and furthermore preferably not less than 70 m/min from the viewpoint of enhancing productivity of the printed material. The transportation speed of the recording medium used in the ink-jet printing in the present invention means a velocity of movement of the recording medium in the direction along which the recording medium is transported upon the ink-jet printing.

The amount of the water-based ink deposited on the recording medium is preferably not less than 0.1 g/m$^2$, and is also preferably not more than 25 g/m$^2$ and more preferably not more than 20 g/m$^2$, in terms of an amount of solid components therein, from the viewpoint of improving hiding power and adhesion properties of the printed characters or images.

With respect to the aforementioned embodiments, the present invention further provides the following aspects relating to the process for producing a printed material and the ink-jet printing method.

<1> A process for producing a printed material, including the following steps 1 and 2:

Step 1: subjecting an image-bearing surface of a printed recording medium 1' on which characters or images are formed by analog printing to discharge treatment under the following conditions to obtain a printed recording medium 1, Discharge Treatment Conditions:

Discharge treatment quantity in terms of an integrated irradiation quantity of electric energy: not less than 0.5 kW·min/m$^2$ and not more than 5.5 kW·min/m$^2$, and Discharge treatment rate in terms of a transportation speed of the printed recording medium: not less than 1 m/min and not more than 100 m/min; and Step 2: further forming characters or images on the image-bearing surface of the printed recording medium 1 obtained in the step 1 by ink-jet printing using a water-based ink to obtain the printed material.

<2> The process for producing a printed material according to the above aspect <1>, wherein a surface free energy (wetting tension) of the image-bearing surface of the printed recording medium 1 obtained in the step 1, i.e., the image-bearing surface after being subjected to the discharge treatment, is preferably not less than 30 mN/m, more preferably not less than 33 mN/m, even more preferably not less than 35 mN/m, further even more preferably not less than 38 mN/m and still further even more preferably not less than 40 mN/m, and is also preferably not more than 60 mN/m, more preferably not more than 55 mN/m and even more preferably not more than 50 mN/m.

<3> The process for producing a printed material according to the above aspect <1> or <2>, wherein the discharge treatment is preferably at least one treatment selected from the group consisting of glow discharge treatment and corona discharge treatment, and more preferably glow discharge treatment.

<4> The process for producing a printed material according to any one of the above aspects <1> to <3>, wherein in the step 1, the discharge treatment is glow discharge treatment, and the discharge treatment quantity in terms of an integrated irradiation quantity of electric energy is preferably not less than 1.0 kW·min/m$^2$, more preferably not less than 1.5 kW·min/m$^2$, even more preferably not less than 2.0 kW·min/m$^2$ and further even more preferably not less than 3.0 kW·min/m$^2$, and is also preferably not more than 5.0 kW·min/m$^2$, more preferably not more than 4.5 kW·min/m$^2$ and even more preferably not more than 4.0 kW·min/m$^2$.

<5> The process for producing a printed material according to any one of the above aspects <1> to <3>, wherein in the step 1, the discharge treatment is corona discharge treatment, and the discharge treatment quantity in terms of an integrated irradiation quantity of electric energy is preferably not less than 0.8 kW·min/m$^2$, more preferably not less than 1.0 kW·min/m$^2$, even more preferably not less than 1.5 kW·min/m$^2$ and further even more preferably not less than 2.0 kW·min/m$^2$, and is also preferably not more than 5.0 kW·min/m$^2$, more preferably not more than 4.5 kW·min/m$^2$, even more preferably not more than 4.0 kW·min/m$^2$, further even more preferably not more than 3.0 kW·min/m$^2$ and still further even more preferably not more than 2.5 kW·min/m$^2$.

<6> The process for producing a printed material according to any one of the above aspects <1> to <5>, wherein a discharge treatment rate in terms of a transportation speed of the printed recording medium is preferably not less than 10 m/min and more preferably not less than 20 m/min, and is also preferably not more than 80 m/min and more preferably not more than 60 m/min.

<7> The process for producing a printed material according to any one of the above aspects <1> to <6>, wherein the printed recording medium 1' used in the step 1 is preferably formed of a resin recording medium or a paper recording medium, and the analog printing is at least one printing method selected from the group consisting of gravure printing, flexographic printing and offset printing.

<8> The process for producing a printed material according to any one of the above aspects <1> to <7>, wherein a surface free energy (wetting tension) of the image-bearing surface of the printed recording medium 1' used in the step 1, i.e., the image-bearing surface before being subjected to the discharge treatment, is preferably not less than 5 mN/m, more preferably not less than 10 mN/m and even more preferably not less than 15 mN/m, and is also preferably less than 30 mN/m, more preferably not more than 28 mN/m, even more preferably not more than 25 mN/m and further even more preferably not more than 20 mN/m.

<9> The process for producing a printed material according to any one of the above aspects <1> to <8>, wherein the ink used in the analog printing contains at least one material selected from the group consisting of a polyamide, a polyurethane, a nitrocellulose, a polyethylene wax and a rosin-modified resin as a solid component of the ink.

<10> The process for producing a printed material according to any one of the above aspects <1> to <9>, wherein a color of the ink used in the analog printing is preferably K (black), W (white) or Y (yellow), more preferably W (white) or Y (yellow), and even more preferably W (white).

<11> The process for producing a printed material according to any one of the above aspects <1> to <10>, wherein a difference between the surface free energy of the printed recording medium 1 and the surface free energy of the printed recording medium 1' is preferably not less than 10 mN/m, more preferably not less than 13 mN/m, even more preferably not less than 15 mN/m and further even more preferably not less than 20 mN/m, and is also preferably not more than 32 mN/m and more preferably not more than 30 mN/m.

<12> The process for producing a printed material according to any one of the above aspects <1> to <11>, wherein in the step 2, the water-based ink is preferably superimposed on at least a part of the image-bearing surface of the printed recording medium 1, and more preferably superimposed on an entire portion of the image-bearing surface of the printed recording medium 1.

<13> The process for producing a printed material according to any one of the above aspects <1> to <12>, wherein in the step 2, the image-bearing surface of the printed recording medium 1 is preferably maintained at a temperature of not lower than 35° C., more preferably not lower than 40° C., even more preferably not lower than 45° C., further even more preferably not lower than 50° C. and still further even more preferably not lower than 55° C., and is also preferably maintained at a temperature of not higher than 80° C., more preferably not higher than 75° C., even more preferably not higher than 70° C. and further even more preferably not higher than 65° C., to form the printed characters or images thereon.

<14> The process for producing a printed material according to any one of the above aspects <1> to <13>, wherein a printing speed in terms of a transportation speed of the printed recording medium is preferably not less than 10 m/min, more preferably not less than 20 m/min, even more preferably not less than 30 m/min, further even more preferably not less than 40 m/min, still further even more preferably not less than 50 m/min, furthermore preferably not less than 60 m/min and furthermore preferably not less than 70 m/min.

<15> The process for producing a printed material according to any one of the above aspects <1> to <14>, wherein the water-based ink contains a pigment (A), a polymer (B), an organic solvent (C) and a surfactant (D).

<16> The process for producing a printed material according to the above aspect <15>, wherein the pigment (A) is in the form of particles formed by dispersing the pigment (A) with the polymer (B).

<17> The process for producing a printed material according to any one of the above aspects <1> to <16>, wherein in the case where a color of the ink used in the analog printing is W (white) or Y (yellow), a color of the water-based ink is preferably at least one color selected from the group consisting of C (cyan), M (magenta), K (black) and a special color (S).

<18> The process for producing a printed material according to any one of the above aspects <1> to <16>, wherein in the case where the color of the ink used in the analog printing is W (white), the color of the water-based ink is preferably at least one color selected from the group consisting of C (cyan), M (magenta), Y (yellow), K (black) and a special color (S).

<19> The process for producing a printed material according to any one of the above aspects <1> to <18>, wherein a static surface tension of the water-based ink as measured at 20° C. is preferably not less than 20 mN/m, more preferably not less than 23 mN/m and even more preferably not less than 25 mN/m, and is also preferably not more than 45 mN/m, more preferably not more than 40 mN/m, even more preferably not more than 35 mN/m and further even more preferably not more than 30 mN/m.

<20> The process for producing a printed material according to any one of the above aspects <1> to <19>, wherein in the case where the discharge treatment is glow discharge treatment, the static surface tension of the water-based ink as measured at 20° C. is preferably not less than 20 mN/m, more preferably not less than 23 mN/m and even more preferably not less than 25 mN/m, and is also preferably not more than 45 mN/m, more preferably not more than 40 mN/m, even more preferably not more than 35 mN/m and further even more preferably not more than 30 mN/m.

<21> The process for producing a printed material according to any one of the above aspects <1> to <19>, wherein in the case where the discharge treatment is corona discharge treatment, the static surface tension of the water-based ink as measured at 20° C. is preferably not less than 20 mN/m, more preferably not less than 25 mN/m, even more preferably not less than 30 mN/m and further even more preferably not less than 35 mN/m.

<22> The process for producing a printed material according to any one of the above aspects <1> to <19>, wherein in the case where the discharge treatment is corona discharge treatment, the static surface tension of the water-based ink as measured at 20° C. is preferably not more than 45 mN/m, more preferably not more than 40 mN/m, even more preferably not more than 35 mN/m and further even more preferably not more than 30 mN/m.

<23> The process for producing a printed material according to any one of the above aspects <1> to <19>, wherein in the case where the discharge treatment is corona discharge treatment, the static surface tension of the water-based ink as measured at 20° C. is preferably not less than 20 mN/m, more preferably not less than 25 mN/m, even more preferably not less than 30 mN/m and further even more preferably not less than 35 mN/m, and also is preferably not more than 45 mN/m and more preferably not more than 40 mN/m.

<24> An ink-jet printing method including the step of ejecting a water-based ink onto a printed recording medium 1 by an ink-jetting method to form characters or images thereon, in which the printed recording medium 1 includes an image-bearing surface on which characters or images are formed by analog printing, and the image-bearing surface is subjected to discharge treatment under the following conditions, Discharge Treatment Conditions:

Discharge treatment quantity in terms of an integrated irradiation quantity of electric energy: not less than 0.5 kW·min/m$^2$ and not more than 5.5 kW·min/m$^2$; and Discharge treatment rate in terms of a transportation speed of the printed recording medium: not less than 1 m/min and not more than 100 m/min.

<25> The ink-jet printing method according to the above aspect <24>, wherein a surface free energy of the printed recording medium 1 is not less than 30 mN/m.

<26> A recording medium for ink-jet printing, including an image-bearing surface on which characters or images are formed by analog printing and which is then subjected to discharge treatment, in which a surface free energy of the image-bearing surface after being subjected to the discharge treatment is not less than 30 mN/m.

<27> The recording medium for ink-jet printing according to the above aspect <26>, wherein the discharge treatment is conducted under the following conditions, Discharge Treatment Conditions:

Discharge treatment quantity in terms of an integrated irradiation quantity of electric energy: not less than 0.5 kW·min/m$^2$ and not more than 5.5 kW·min/m$^2$; and Discharge treatment rate in terms of a transportation speed of the printed recording medium: not less than 1 m/min and not more than 100 m/min.
<28> A use of the recording medium according to the above aspect <26> or <27> for ink-jet printing.
<29> A printed material including an image-bearing surface on which characters or images are formed by analog printing and then on at least a part of which characters or images are further formed by ink-jet printing using a water-based ink, in which the image-bearing surface after forming the characters or images thereon by the analog printing is subjected to discharge treatment, and a surface free energy of the image-bearing surface after being subjected to the discharge treatment is not less than 30 mN/m.
<30> The printed material according to the above aspect <29>, wherein the discharge treatment is conducted under the following conditions.
Discharge Treatment Conditions:
Discharge treatment quantity in terms of an integrated irradiation quantity of electric energy: not less than 0.5 kW·min/m² and not more than 5.5 kW·min/m²; and
Discharge treatment rate in terms of a transportation speed of a printed recording medium: not less than 1 m/min and not more than 100 m/min.

EXAMPLES

In the following Production Examples, Preparation Examples, Examples and Comparative Examples, the "part(s)" and "%" indicate "part(s) by mass" and "% by mass", respectively, unless otherwise specified.
(1) Measurement of Weight-Average Molecular Weight of Polymer
The weight-average molecular weight of the polymer was measured by gel permeation chromatography [GPC apparatus: "HLC-8120GPC" available from Tosoh Corporation; columns: "TSK-GEL, α-M"×2 available from Tosoh Corporation; flow rate: 1 mL/min] using a solution prepared by dissolving phosphoric acid and lithium bromide in N,N-dimethyl formamide such that concentrations of phosphoric acid and lithium bromide in the resulting solution were 60 mmol/L and 50 mmol/L, respectively, as an eluent, and using monodisperse polystyrenes having previously known molecular weights as a reference standard substance.
(2) Measurement of Average Particle Size of Pigment-Containing Water-Insoluble Polymer Particles in Pigment Water Dispersion or Water-Based Ink
The particles were subjected to cumulant analysis using a laser particle analyzing system "ELS-8000" available from Otsuka Electrics Co., Ltd., to measure an average particle size thereof. The above measurement was conducted under the conditions including a temperature of 25° C., an angle between incident light and detector of 90° and a cumulative number of 100 times, and a refractive index of water (1.333) was input to the analyzing system as a refractive index of the dispersing medium. The measurement was also conducted by adjusting a concentration of the sample to be measured to 5×10⁻³% in terms of a solid content thereof.
(3) Measurement of Solid Content
Sodium sulfate dried to constant weight in a desiccator was weighed in an amount of 10.0 g and charged into a 30 mL polypropylene container (φ: 40 mm; height: 30 mm), and about 1.0 g of a sample to be measured was added to the container. The contents of the container were mixed with each other and then accurately weighed. The resulting mixture was maintained in the container at 105° C. for 2 hours to remove volatile components therefrom, and further allowed to stand in a desiccator for 15 minutes, and then a mass thereof was measured. The mass of the sample after removing the volatile components therefrom was regarded as a mass of solids therein. The solid content of the sample was calculated by dividing the mass of the solids by the mass of the sample initially added.
(4) Measurement of Static Surface Tension of Water-Based Ink
A platinum plate was dipped in 5 g of the water-based ink filled in a cylindrical polyethylene container (3.6 cm in diameter×1.2 cm in depth), and the static surface tension of the water-based ink was measured at 20° C. using a surface tension meter "CBVP-Z" (tradename) available from Kyowa Interface Science Co., Ltd.
(5) Measurement of Viscosity of Water-Based Ink
The viscosity of the water-based ink was measured at 32° C. using an E-type viscometer "TV-25" (equipped with a standard cone rotor (1°34'×R24); rotating speed: 50 rpm) available from Toki Sangyo Co., Ltd.
(6) Measurement of pH of Water-Based Ink
The pH value of the water-based ink was measured at 20° C. using a bench-top pH meter "F-71" available from Horiba Ltd., equipped with a pH electrode "6337-10D" available from Horiba Ltd.

Production Example 1 (Production of Water-Insoluble Polymer 1)

The respective monomers, solvent and chain transfer agent shown in the column "Initially Charged Monomer Solution" in Table 1 were charged into a reaction vessel equipped with two dropping funnels 1 and 2 and mixed with each other, and an inside atmosphere of the reaction vessel was replaced with nitrogen gas, thereby obtaining an initially charged monomer solution.
Next, the respective monomers, solvent, polymerization initiator and chain transfer agent shown in the column "Dropping Monomer Solution 1" in Table 1 were mixed with each other to obtain a dropping monomer solution 1. The thus obtained dropping monomer solution 1 was charged into the dropping funnel 1, and an inside atmosphere of the dropping funnel 1 was replaced with nitrogen gas. In addition, the respective monomers, solvent, polymerization initiator and chain transfer agent shown in the column "Dropping Monomer Solution 2" in Table 1 were mixed with each other to obtain a dropping monomer solution 2. The thus obtained dropping monomer solution 2 was charged into the dropping funnel 2, and an inside atmosphere of the dropping funnel 2 was replaced with nitrogen gas.
Next, in a nitrogen atmosphere, the initially charged monomer solution in the reaction vessel was maintained at 77° C. while stirring, and the dropping monomer solution 1 in the dropping funnel 1 was gradually added dropwise to the reaction vessel over 3 hours. Then, the dropping monomer solution 2 in the dropping funnel 2 was gradually added dropwise to the reaction vessel over 2 hours. After completion of the dropwise addition, the mixed solution in the reaction vessel was stirred at 77° C. for 0.5 hour.
Then, a polymerization initiator solution prepared by dissolving 1 part of the polymerization initiator in 50 parts of methyl ethyl ketone (hereinafter also referred to merely as "MEK") was added to the aforementioned mixed solution, and the resulting reaction solution was aged at 77° C. for 0.5 hour while stirring. The aforementioned procedure including the preparation and addition of the polymerization initiator solution and the aging of the reaction solution was repeated five more times. Then, while maintaining the reaction solution in the reaction vessel at 80° C. for 1 hour, MEK was added thereto to adjust a solid content of the reaction solution to 40%, thereby obtaining a solution of a water-insoluble polymer 1 used as the polymer (B). The weight-average molecular weight and acid value of the water-insoluble polymer 1 were 224,000 and 72 mgKOH/g, respectively.

The ratio of the monomer charged as shown in Table 1 was 50% of a content of solid components in the monomer charged in the case where the monomer was a macromer, and 100% of a content of solid components in the monomer charged in the case where the monomer was a monomer other than the macromer. In addition, the amounts of the respective monomer solutions charged as shown in Table 1 represent amounts of the solutions themselves charged.

Meanwhile, the details of the respective components shown in Table 1 are as follows.

Methacrylic acid: Reagent available from Wako Pure Chemical Industries, Ltd.

Benzyl methacrylate: Reagent available from Wako Pure Chemical Industries, Ltd.

Styrene-based macromer: "AS-6S" (tradename; number-average molecular weight: 6,000; 50% toluene solution) available from Toagosei Co., Ltd.

43PAPE-600B: "BLEMMER 43PAPE-600B" (tradename; phenoxy polyethylene glycol/polypropylene glycol monomethacrylate; average molar number of addition of ethyleneoxide: 6; average molar number of addition of propyleneoxide: 6; block-addition) available from NOF Corporation V-65: "V-65" (tradename; 2,2'-azobis(2,4-dimethylvaleronitrile)) available from Wako Pure Chemical Industries, Ltd.

2-Mercaptoethanol: Reagent available from Wako Pure Chemical Industries, Ltd.

The resulting MEK solution of the water-insoluble polymer 1 was charged into a 2 L-capacity disper, and while stirring the solution at 1,400 rpm using a stirring blade having a blade diameter of 40 mmϕ, 303.1 parts of ion-exchanged water, 7.9 parts of a 5N sodium hydroxide aqueous solution and 3.5 parts of a 25% ammonia aqueous solution were added thereto such that the degree of neutralization of the water-insoluble polymer by sodium hydroxide was adjusted to 65% and the degree of neutralization of the water-insoluble polymer by ammonia was adjusted to 100%. The resulting reaction solution was stirred at 1,400 rpm for 15 minutes while cooling the solution in a water bath at 0° C.

Then, 60 parts of Pigment Black 7 (carbon black; "MONARCH 717" (tradename)) available from Cabot Japan K.K., as the pigment (A) were added to the reaction solution, and the resulting mixture was stirred at 6,400 rpm for 1 hour. The obtained pigment mixture was subjected to dispersion treatment under a pressure of 150 MPa by passing the mixture through a Microfluidizer "M-110EH-30XP" available from Microfluidics Corporation 15 times, thereby obtaining a dispersion treatment product having a solid content of 15%.

A 2 L eggplant-shaped flask was charged with 667 parts of the thus obtained dispersion treatment product, and then the dispersion treatment product filled in the flask was maintained under a pressure of 0.09 MPa in a warm water bath adjusted at 60° C. for 1 hour using a reduced pressure distillation apparatus "Rotary Evaporator N-1000S" available from Tokyo Rikakikai Co., Ltd., operated at a rotating speed of 50 rpm to thereby remove the organic solvent (MEK) therefrom. Further, the pressure of the distillation apparatus was reduced to 0.07 MPa, and the solution was concentrated under this condition until reaching a solid content of 25%.

The thus obtained concentrated solution was charged into a 500 mL angle rotor, and subjected to centrifugal separation

TABLE 1

|  | Ratio of monomer charged (%) | Initially charged monomer solution (part(s)) | Dropping monomer solution 1 (part(s)) | Dropping monomer solution 2 (part(s)) |
| --- | --- | --- | --- | --- |
| Ionic monomer | | | | |
| Methacrylic acid | 11 | — | 88 | 22 |
| Hydrophobic monomer | | | | |
| Benzyl methacrylate | 49 | 49 | 392 | 49 |
| Styrene-based macromer | 10 | 20 | 180 | — |
| Hydrophilic nonionic monomer | | | | |
| 43PAPE-600B | 30 | 30 | 240 | 30 |
| Solvent | | | | |
| Methyl ethyl ketone | | 22.5 | 247.5 | 180 |
| Polymerization initiator | | | | |
| V-65 | | — | 8 | 2 |
| Chain transfer agent | | | | |
| 2-Mercaptoethanol | | 0.3 | 2.1 | 0.6 |

Production Example 2 (Production of Pigment Water Dispersion 1)

The water-insoluble polymer 1 solution (solid content: 40%) obtained in Production Example 1 and MEK were mixed with each other in amounts of 100 parts and 33.5 parts, respectively, thereby obtaining an MEK solution of the water-insoluble polymer 1.

using a high-speed cooling centrifuge "himac CR22G" (temperature set: 20° C.) available from Hitachi Koki Co., Ltd., at 6,000 rpm for 20 minutes. Thereafter, the resulting liquid layer portion was subjected to filtration treatment through a 5 μm-mesh membrane filter "Minisart" available from Sartorius Inc.

Four hundred parts of the resulting filtrate (pigment: 72 parts; water-insoluble polymer 1: 24 parts) were mixed with 55.4 parts of ion-exchanged water, and further mixed with 0.6 part of "Ploxel LV(S)", followed by stirring the resulting mixture at 70° C. for 1 hour. The mixture was cooled to 25° C. and then subjected to filtration treatment through the aforementioned 5 µm-mesh membrane filter. Furthermore, the obtained filtrate was mixed with ion-exchanged water so as to adjust a solid content thereof to 20%, thereby obtaining a pigment water dispersion 1 containing pigment-containing water-insoluble polymer particles. The mass ratio of the pigment to the water-insoluble polymer [pigment/water-insoluble polymer] in the pigment-containing water-insoluble polymer particles contained in the thus obtained pigment water dispersion 1 was 75/25, and the average particle size of the pigment-containing water-insoluble polymer particles was 100 nm.

Ink Preparation Example 1 (Preparation of Water-Based Ink (a))

The pigment water dispersion 1 obtained in Production Example 2 was used to prepare a water-based ink (a) for ink-jet printing. That is, the respective components having the below-mentioned composition (100 parts in total) were compounded with each other such that the contents of the pigment (A) and the polymer (B) in the resulting ink were 5% and 1.7%, respectively, followed by mixing and stirring the resulting mixture for 30 minutes, thereby obtaining a mixed solution. The thus obtained mixed solution was subjected to filtration treatment through the aforementioned 5 µm-mesh membrane filter to thereby obtain the water-based ink (a). As a result, it was confirmed that the static surface tension of the resulting water-based ink as measured at 20° C. was 26 mN/m, the viscosity of the ink as measured at 32° C. was 5.8 mPa·s, the pH value of the ink as measured at 20° C. was 8.9, and the average particle size of the particles contained in the ink was 98 nm.

(Ink Composition)

| | |
|---|---|
| Pigment water dispersion 1 | 33.3 parts |
| Propylene glycol available from Wako Pure Chemical Industries, Ltd. | 30 parts |
| "SURFYNOL 104PG-50" (a propylene glycol solution of an acetylene glycol-based surfactant; active ingredient content: 50%) available from Nissin Chemical Co., Ltd. | 0.5 part |
| "EMULGEN 120" (polyoxyethylene lauryl ether) available from Kao Corporation | 0.5 part |
| Ion-exchanged water | 35.7 parts |

Ink Preparation Examples 2 and 3 (Preparation of Water-Based Inks (b) and (c))

The same procedure as in Ink Preparation Example 1 was repeated except that the ink composition was changed as shown in Table 2, thereby obtaining water-based inks (b) and (c) for ink-jet printing. The static surface tension of each of the resulting water-based inks as measured at 20° C., the viscosity of each of the water-based inks as measured at 32° C., the pH value of each of the water-based inks as measured at 20° C. and the average particle size of the particles contained in each of the water-based inks are shown in Table 2.

TABLE 2

| | | Water-based ink | | |
|---|---|---|---|---|
| | | (a) | (b) | (c) |
| Composition (part(s)) | Pigment water dispersion 1 | 33.3 | 33.3 | 33.3 |
| | Propylene glycol | 30 | 30 | 30 |
| | "SURFYNOL 104PG-50" | 0.5 | 0.02 | 0 |
| | "EMULGEN 120" | 0.5 | 0.02 | 0 |
| | Ion-exchanged water | 35.7 | 36.7 | 36.7 |
| Properties | Viscosity (mPa · s) | 5.8 | 5.4 | 5.2 |
| | Static surface tension (mN/m) | 26 | 37 | 43 |
| | pH | 8.9 | 9.1 | 9.1 |
| | Average particle size (nm) | 98 | 95 | 95 |

Preparation Example 1'-1 (Preparation of Printed Recording Medium 1'-1)

An oil-based gravure white ink "PANNECO AM" (tradename; containing a polyamide-based resin) available from TOYO INK Co., Ltd., was diluted with a diluent ("PN102" solvent) so as to control a viscosity of the white ink to 15 seconds as measured by Zahn Cup #3. Next, the diluted white ink was applied to a polyethylene terephthalate film substrate "LUMIRROR" (tradename; product number: "T60"; thickness: 125 µm) as a recording medium available from Toray Industries, Inc., using a bar coater #8 (coating amount: 13 mL/m$^2$), and then dried at 70° C. for 10 minutes using a hot air dryer, thereby obtaining a printed recording medium 1'-1 on which a solid image was formed. When measuring a surface free energy of the image-bearing surface of the resulting printed recording medium 1'-1 by the below-mentioned method, it was confirmed that the surface free energy was 15 mN/m.

Preparation Example 1'-2 (Preparation of Printed Recording Medium 1'-2)

The same procedure as in Preparation Example 1'-1 was repeated except that an aqueous flexographic white ink "AQUAGRACE" (tradename) available from TOYO INK Co., Ltd., was used in place of the oil-based gravure white ink "PANNECO AM" (tradename) available from TOYO INK Co., Ltd., thereby obtaining a printed recording medium 1'-2 on which a solid image was formed. When measuring a surface free energy of the image-bearing surface of the resulting printed recording medium 1'-2 by the below-mentioned method, it was confirmed that the surface free energy was 20 mN/m.

Preparation Example 1'-3 (Preparation of Printed Recording Medium 1'-3)

The same procedure as in Preparation Example 1'-1 was repeated except that an offset coated paper "OK Topcoat Plus" (tradename; basis weight: 104.7 g/m$^2$) available from Oji Paper Co., Ltd., was used as a recording medium in place of the polyethylene terephthalate film substrate, and an offset yellow ink "Opis100" (tradename) available from OSAKA PRINTING INK MFG. CO., LTD., was used in place of the oil-based gravure white ink "PANNECO AM" (tradename) available from TOYO INK Co., Ltd., thereby obtaining a printed recording medium 1'-3 on which a solid image was formed. When measuring a surface free energy of the image-bearing surface of the resulting printed recording medium 1'-3 by the below-mentioned method, it was confirmed that the surface free energy was 23 mN/m.

Example 1

(Step 1)

The image-bearing surface of the printed recording medium 1'-1 obtained in Preparation Example 1'-1 was subjected to glow discharge treatment in which nitrogen plasma gas (flow rate: 30 L/min; gas temperature: 155° C.) was irradiated (discharge treatment quantity in terms of an integrated irradiation quantity of electric energy: 1.6 kW·min/m$^2$) to the image-bearing surface of the printed recording medium 1'-1 at a discharge treatment rate (in terms of a transportation speed of the printed recording medium) of 50 m/min one time using an atmospheric pressure plasma modification apparatus "Tough Plasma FPE20" (tradename) available from FUJI Corporation, thereby obtaining a printed recording medium 1-1.

(Step 2)

The temperature of the image-bearing surface of the printed recording medium 1-1 obtained in the step 1 was maintained at 60° C. using a plate heater, and solid image printing was conducted on the image-bearing surface of the printed recording medium 1-1 with the water-based ink (a) obtained in Preparation Example 1 at a printing speed of 75 m/min (in terms of a transportation speed of the printed recording medium) using an ink-jet printer "One Pass Jet" (tradename; ejection frequency: 20 kHz; amount of ink droplets ejected: 7 pL) available from Trytek Co., Ltd., equipped with an ink-jet print head "Model No. KJ4B" (resolution: 600 dpi) available from Kyocera Corporation, thereby obtaining a printed material 1.

Examples 2 and 3

The same procedure as in Example 1 was repeated except that the number of irradiation of the nitrogen plasma gas by the atmospheric pressure plasma modification apparatus used in the step 1 was changed as shown in Table 3 to vary the discharge treatment quantity (in terms of an integrated irradiation quantity of electric energy), thereby obtaining printed materials 2 and 3.

Examples 4, 5 and 10

The same procedure as in Example 1 was repeated except that the corona discharge treatment was conducted at a discharge treatment rate (in terms of a transportation speed of the printed recording medium) of 1 m/min using a corona treatment apparatus "TEC-4AX" (tradename) available from KASUGA DENKI, Inc., in place of the atmospheric pressure plasma modification apparatus used in the step 1, and the discharge treatment quantity (in terms of an integrated irradiation quantity of electric energy) was changed as shown in Table 3, thereby obtaining printed materials 4, 5 and 10.

Examples 6 and 7

The same procedure as in Example 5 was repeated except that in the step 2 of Example 5, the temperature of the image-bearing surface of the printed recording medium 1 obtained in the step 1 was changed to the respective temperatures shown in Table 3, thereby obtaining printed materials 6 and 7.

Examples 8 and 9

The same procedure as in Example 5 was repeated except that the water-based ink (a) was replaced with the respective water-based inks shown in Table 3, thereby obtaining printed materials 8 and 9.

Example 11

The same procedure as in Example 4 was repeated except that in the step 1 of Example 4, the printed recording medium 1'-2 obtained in Preparation Example 1'-2 was used in place of the printed recording medium 1'-1, and the discharge treatment quantity (in terms of an integrated irradiation quantity of electric energy) was changed as shown in Table 3, thereby obtaining a printed material 11.

Example 12

The same procedure as in Example 4 was repeated except that in the step 1 of Example 4, the printed recording medium 1'-3 obtained in Preparation Example 1'-3 was used in place of the printed recording medium 1'-1, and the discharge treatment quantity (in terms of an integrated irradiation quantity of electric energy) was changed as shown in Table 3, thereby obtaining a printed material 12.

Comparative Example 1

The same procedure as in Example 1 was repeated except that no glow discharge treatment was conducted in the step 1, thereby obtaining a printed material C1. More specifically, in Comparative Example 1, the same procedure as in Example 1 was repeated except that no step 1 was conducted, and the printed recording medium 1'-1 was used as a printed recording medium 1C-1 in place of the printed recording medium 1-1 used in the step 2.

Comparative Example 2

The same procedure as in Example 4 was repeated except that in the corona discharge treatment of Example 4, the discharge treatment quantity (in terms of an integrated irradiation quantity of electric energy) was changed to 0.2 kW·min/m$^2$, thereby obtaining a printed material C2.

Comparative Example 3

The same procedure as in Example 1 was repeated except that the number of irradiation of the nitrogen plasma gas by the atmospheric pressure plasma modification apparatus used in the step 1 was changed to 4 times, and the discharge treatment quantity (in terms of an integrated irradiation quantity of electric energy) was changed to 6.4 kW·min/m$^2$, thereby obtaining a printed material C3.

Although it was possible to evaluate hiding power and adhesion properties of the resulting printed material, the film substrate used as the recording medium suffered from deformation, and therefore the resulting printed material was unusable in practical applications.

Comparative Example 4

The same procedure as in Example 11 was repeated except that no corona discharge treatment was conducted in the step 1, thereby obtaining a printed material C4. More specifically, in Comparative Example 4, the same procedure as in Example 11 was repeated except that no step 1 was conducted, and the printed recording medium 1'-2 was used as a printed recording medium 1C-4 in place of the printed recording medium 1-11 used in the step 2.

Comparative Example 5

The same procedure as in Example 12 was repeated except that no corona discharge treatment was conducted in the step 1, thereby obtaining a printed material C5. More specifically, in Comparative Example 5, the same procedure as in Example 12 was repeated except that no step 1 was conducted, and the printed recording medium 1'-3 was used as a printed recording medium 1C-5 in place of the printed recording medium 1-12 used in the step 2.

[Evaluation of Surface Free Energy (Wetting Tension) of Image-Bearing Surface]

The wetting tension of the image-bearing surface of the printed recording medium was measured using a mixed solution for wetting tension test available from Wako Pure Chemical Industries, Ltd., according to the wetting tension test prescribed in JIS K6768. The results are shown in Table 3.

[Evaluation of Hiding Power (Optical Density)]

The optical density of the solid image printed portion (Duty 100%) formed by ink-jet printing on the resulting printed material was measured using a spectrophotometer "SpectroEye" (tradename) available from GretagMacbeth AG in a density measuring mode of (DIN, Abs). As the measured optical density value increases, the water-based ink is more excellent in hiding power. The results are shown in Table 3.

[Evaluation of Adhesion Properties]

A tape "CELLOTAPE (registered trademark) CT-18S" having a width of 18 mm available from Nichiban Co., Ltd., was attached onto a solid image printed portion formed on the resulting printed material. Then, the tape was peeled off from the solid image printed portion, and then the surface condition of the solid image printed portion from which the tape had been peeled off was observed to evaluate adhesion properties thereof according to the following evaluation ratings. When the surface condition was the rank A or B according to the following evaluation ratings, the printed material was usable in practical applications. The results are shown in Table 3.

(Evaluation Ratings)
A: No peeling of the solid image printed portion occurred.
B: Peeled area of the solid image printed portion was less than 10%.
C: Peeled area of the solid image printed portion was not less than 10%.

[Occurrence or Non-Occurrence of Deformation of Recording Medium]

Whether or not the recording medium of the resulting printed material suffered from any deformation was visually observed. The results are shown in Table 3.

TABLE 3-1

| | | | Examples | | | | | | | | |
|---|---|---|---|---|---|---|---|---|---|---|---|
| | | | 1 | 2 | 3 | 4 | 5 | 6 | 7 | 8 | 9 |
| Step 1 | Printed recording medium 1' | No. | 1'-1 | 1'-1 | 1'-1 | 1'-1 | 1'-1 | 1'-1 | 1'-1 | 1'-1 | 1'-1 |
| | | Kind of recording medium | Resin | Resin | Resin | Resin | Resin | Resin | Resin | Resin | Resin |
| | | Kind of analog printing ink | *A | *A | *A | *A | *A | *A | *A | *A | *A |
| | | Color of ink | White | White | White | White | White | White | White | White | White |
| | Glow discharge treatment | Number of irradiation | 1 | 2 | 3 | | | | | | |
| | | Integrated irradiation quantity of electric energy (kW · min/m$^2$) | 1.6 | 3.2 | 4.8 | | | | | | |
| | Corona discharge treatment | Integrated irradiation quantity of electric energy (kW · min/m$^2$) | | | | 1.0 | 2.0 | 2.0 | 2.0 | 2.0 | 2.0 |
| | Surface free energy (wetting tension) of printed recording medium 1 | (mN/m) | 31 | 36 | 45 | 42 | 45 | 45 | 45 | 45 | 45 |
| | Printed recording medium 1 | No. | 1-1 | 1-2 | 1-3 | 1-4 | 1-5 | 1-6 | 1-7 | 1-8 | 1-9 |
| | Difference between surface free energies (mN/m)*[1] | | 16 | 21 | 30 | 27 | 30 | 30 | 30 | 30 | 30 |

Note
*[1]Difference (mN/m) between surface free energy of printed recording medium 1 and surface free energy of printed recording medium 1';
*A: Oil-based gravure ink

TABLE 3-2

| | | | | Examples | | | | | | | | |
|---|---|---|---|---|---|---|---|---|---|---|---|---|
| | | | | 1 | 2 | 3 | 4 | 5 | 6 | 7 | 8 | 9 |
| | Step 2 | Ink composition | Kind | (a) | (a) | (a) | (a) | (a) | (a) | (a) | (b) | (c) |
| | | Printed recording medium 1 | Temperature of image-bearing surface (° C.) | 60 | 60 | 60 | 60 | 60 | 40 | 70 | 60 | 60 |
| | | Printed material | Kind | 1 | 2 | 3 | 4 | 5 | 6 | 7 | 8 | 9 |

TABLE 3-2-continued

| | | Examples | | | | | | | | |
|---|---|---|---|---|---|---|---|---|---|---|
| | | 1 | 2 | 3 | 4 | 5 | 6 | 7 | 8 | 9 |
| Evaluation | Hiding power (optical density) | 1.72 | 1.85 | 1.88 | 1.66 | 1.74 | 1.65 | 1.77 | 1.67 | 1.62 |
| | Adhesion properties | B | A | A | B | B | B | B | A | A |
| | Occurrence or non-occurrence of deformation of recording medium | None | None | None | None | None | None | None | None | None |

TABLE 3-3

| | | | Examples | | | Comparative Examples | | | | |
|---|---|---|---|---|---|---|---|---|---|---|
| | | | 10 | 11 | 12 | 1 | 2 | 3 | 4 | 5 |
| Step 1 | Printed recording medium 1' | No. | 1'-1 | 1'-2 | 1'-3 | 1'-1 | 1'-1 | 1'-1 | 1'-2 | 1'-3 |
| | | Kind of recording medium | Resin | Resin | Paper | Resin | Resin | Resin | Resin | Paper |
| | | Kind of analog printing ink | *A | *B | *C | *A | *A | *A | *B | *C |
| | | Color of ink | White | White | Yellow | White | White | White | White | Yellow |
| | Glow discharge treatment | Number of irradiation | | | | | | 4 | | |
| | | Integrated irradiation quantity of electric energy (kW · min/m$^2$) | | | | | | 6.4 | | |
| | Corona discharge treatment | Integrated irradiation quantity of electric energy (kW · min/m$^2$) | 2.4 | 2.0 | 2.0 | | 0.2 | | | |
| | Surface free energy (wetting tension) of printed recording medium 1 | (mN/m) | 47 | 44 | 38 | 15 | 20 | 48 | 20 | 23 |
| | Printed recording medium 1 | No. | 1-10 | 1-11 | 1-12 | 1C-1 | 1C-2 | 1C-3 | 1C-4 | 1C-5 |
| | Difference between surface free energies (mN/m)*$^1$ | | 32 | 24 | 15 | — | 5 | 33 | — | — |

Note
*$^1$Difference (mN/m) between surface free energy of printed recording medium 1 and surface free energy of printed recording medium 1'
*A: Oil-based gravure ink;
*B: Aqueous flexographic ink;
*C: Offset ink

TABLE 3-4

| | | | Examples | | | Comparative Examples | | | | |
|---|---|---|---|---|---|---|---|---|---|---|
| | | | 10 | 11 | 12 | 1 | 2 | 3 | 4 | 5 |
| Step 2 | Ink composition | Kind | (a) | (a) | (a) | (a) | (a) | (a) | (a) | (a) |
| | Printed recording medium 1 | Temperature of image-bearing surface (° C.) | 60 | 60 | 60 | 60 | 60 | 60 | 60 | 60 |
| | Printed material | Kind | 10 | 11 | 12 | C1 | C2 | C3 | C4 | C5 |
| Evaluation | Hiding power (optical density) | | 1.81 | 1.78 | 1.80 | 1.35 | 1.38 | 1.90 | 1.45 | 1.48 |
| | Adhesion properties | | B | B | B | C | C | A | C | C |
| | Occurrence or non-occurrence of deformation of recording medium | | None | None | None | None | None | Occurred | None | None |

From Table 3, it was confirmed that the printed materials obtained in Examples 1 to 12 exhibited high optical density and excellent hiding power and were also excellent in adhesion properties of the image-bearing surface thereof while suppressing deformation of the recording medium, as compared to those printed materials obtained in Comparative Examples 1 to 5.

INDUSTRIAL APPLICABILITY

In accordance with the process for producing a printed material, the ink-jet printing method and the recording medium for ink-jet printing as defined in the present invention, it is possible to produce a printed material that is excellent in hiding power and adhesion properties of the printed characters or images formed thereon by ink-jet printing. Therefore, the present invention can be suitably applied to a process of producing a printed material in which variable data are additionally printed by ink-jet printing using a water-based ink on an image-bearing surface on which characters or images have been formed by analog printing, an ink-jet printing method for obtaining a printed material having a good image quality, and a recording medium for ink-jet printing.

The invention claimed is:

1. A process for producing a printed material, comprising the following steps 1 and 2:
   Step 1: subjecting an image-bearing surface of a printed recording medium 1' on which characters or images are formed by analog printing to discharge treatment under the following conditions to obtain a printed recording medium 1,
   Discharge treatment conditions:
   Discharge treatment quantity in terms of an integrated irradiation quantity of electric energy: not less than 0.5 kW·min/m² and not more than 5.5 kW·min/m², and
   Discharge treatment rate in terms of a transportation speed of the printed recording medium: not less than 1 m/min and not more than 100 m/min; and
   Step 2: further forming characters or images on the image-bearing surface of the printed recording medium 1 obtained in the step 1 by ink-jet printing using a water-based ink to obtain the printed material.

2. The process for producing a printed material according to claim 1, wherein the image-bearing surface of the printed recording medium 1' used in the step 1 has a surface free energy of not more than 25 mN/m.

3. The process for producing a printed material according to claim 1, wherein the image-bearing surface of the printed recording medium 1 obtained in the step 1 has a surface free energy of not less than 30 mN/m.

4. The process for producing a printed material according to claim 1, wherein a difference between the surface free energy of the printed recording medium 1 and the surface free energy of the printed recording medium 1' is not less than 10 mN/m and not more than 32 mN/m.

5. The process for producing a printed material according to claim 1, wherein the discharge treatment is at least one treatment selected from the group consisting of glow discharge treatment and corona discharge treatment.

6. The process for producing a printed material according to claim 1, wherein in the step 2, the water-based ink is superimposed on at least a part of the image-bearing surface of the printed recording medium 1.

7. The process for producing a printed material according to claim 1, wherein in the step 1, the printed recording medium 1' is formed of a resin recording medium or a paper recording medium, and the analog printing is at least one printing method selected from the group consisting of gravure printing, flexographic printing and offset printing.

8. The process for producing a printed material according to claim 1, wherein in the step 1, the discharge treatment is glow discharge treatment, and the discharge treatment quantity in terms of an integrated irradiation quantity of electric energy is not less than 1.0 kW·min/m² and not more than 5.0 kW·min/m².

9. The process for producing a printed material according to claim 1, wherein in the step 1, the discharge treatment is corona discharge treatment, and the discharge treatment quantity in terms of an integrated irradiation quantity of electric energy is not less than 0.5 kW·min/m² and not more than 3.0 kW·min/m².

10. The process for producing a printed material according to claim 1, wherein in the step 2, the image-bearing surface of the printed recording medium 1 is maintained at a temperature of not lower than 35° C. and not higher than 75° C. to form characters or images on the image-bearing surface.

11. The process for producing a printed material according to claim 1, wherein the water-based ink has a static surface tension of not more than 45 mN/m.

12. The process for producing a printed material according to claim 1, wherein in the step 1, the printed recording medium 1' is formed of a resin recording medium.

* * * * *